(12) United States Patent
Ajimoto

(10) Patent No.: US 9,080,520 B2
(45) Date of Patent: Jul. 14, 2015

(54) VEHICLE CONTROL APPARATUS

(75) Inventor: Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 13/610,515

(22) Filed: Sep. 11, 2012

(65) Prior Publication Data

US 2013/0080003 A1    Mar. 28, 2013

(30) Foreign Application Priority Data

Sep. 27, 2011  (JP) .................... 2011-210416

(51) Int. Cl.
| | |
|---|---|
| *F02D 29/02* | (2006.01) |
| *F16H 61/662* | (2006.01) |
| *F02D 41/02* | (2006.01) |
| *F16H 63/50* | (2006.01) |
| *F16H 59/08* | (2006.01) |
| *F16H 59/02* | (2006.01) |
| *F16H 61/04* | (2006.01) |

(52) U.S. Cl.
CPC ............. *F02D 29/02* (2013.01); *F02D 41/023* (2013.01); *F16H 61/66259* (2013.01); *F16H 63/502* (2013.01); *B60W 2510/0695* (2013.01); *F02D 2400/12* (2013.01); *F16H 61/04* (2013.01); *F16H 2059/0226* (2013.01); *F16H 2059/084* (2013.01); *F16H 2059/085* (2013.01)

(58) Field of Classification Search
USPC ............ 701/54, 58, 114, 67; 477/3, 5, 48, 34; 475/198
See application file for complete search history.

(56) References Cited

U.S. PATENT DOCUMENTS

| | | | | |
|---|---|---|---|---|
| 7,389,176 | B2 * | 6/2008 | Kadono et al. | 701/114 |
| 7,869,926 | B2 * | 1/2011 | Tuckfield et al. | 701/56 |
| 2002/0019692 | A1 * | 2/2002 | Yasuoka et al. | 701/55 |
| 2007/0287589 | A1 * | 12/2007 | Kadono et al. | 477/110 |

FOREIGN PATENT DOCUMENTS

JP          11-020513 A          1/1999

* cited by examiner

*Primary Examiner* — Tuan C. To
*Assistant Examiner* — Isaac Smith
(74) *Attorney, Agent, or Firm* — McGinn IP Law Group, PLLC

(57) ABSTRACT

In a vehicle control apparatus, an engine torque calculating unit calculates a developing engine torque Te, and a torque increase/decrease amount calculating unit calculates a torque increase or decrease amount Tmax of an engine which can be increased or decreased. A mode coefficient setting unit sets a mode coefficient k corresponding to a driving mode, and an allowable inertia calculating unit multiplies the torque increase or decrease amount Tmax by the mode coefficient k to calculate an allowable inertia torque Timax. A shift speed calculating unit calculates a shift speed V1 of a continuously variable transmission at which the allowable inertia torque Timax is generated, and an upper-limit shift speed setting unit sets an upper-limit shift speed V2 based on the shift speed V1. A shift control unit performs shift control of the continuously variable transmission at a shift speed not exceeding the upper-limit shift speed V2.

13 Claims, 18 Drawing Sheets

VEHICLE CONTROL APPARATUS

CROSS-REFERENCE TO RELATED APPLICATIONS

The present application claims priority from Japanese Patent Application No. 2011-210416 filed on Sep. 27, 2011, the entire contents of which are hereby incorporated by reference.

BACKGROUND OF THE INVENTION

1. Field of the Invention

The present invention relates to a vehicle control apparatus that includes a power unit having an engine and a continuously variable transmission connected to the engine, and a power unit controller for switching the power characteristics of the power unit in accordance with the driving mode.

2. Description of the Related Art

A continuously variable transmission provided in a power transmission system of a vehicle includes a primary pulley mounted on an input shaft, a secondary pulley mounted on an output shaft, and a drive chain wrapped around these pulleys. In such a continuously variable transmission, any speed ratio can be set by regulating groove widths of the pulleys. Hence, the speed ratio can be switched in stages to perform speed shifting as in a manual transmission or an automatic transmission. As a result, also in the vehicle equipped with the continuously variable transmission, the same shift feel as that of a multi-stage transmission can be obtained, thereby enhancing marketability of the vehicle.

During speed shifting in such a multi-stage transmission mode, because the speed ratio is switched in stages, the shift speed is higher than that in a continuously variable transmission mode, in which the speed ratio is continuously changed. Accordingly, upon upshifting in the multi-stage transmission mode, an input side rotational speed is rapidly reduced to generate inertia torque due to inertia in the primary pulley or the like. The inertia torque acts in a direction to accelerate the primary pulley, thereby temporarily increasing output torque from the continuously variable transmission to cause shift shock.

In order to avoid the shift shock caused by the inertia torque, a technique has been developed. The technique includes reducing engine torque during an upshift, thereby allowing the inertia torque during the upshift to be absorbed. However, in a coasting state in which the engine torque is very small, it is difficult to reduce the engine torque by an amount equivalent to that of the inertia torque. Accordingly, another technique has been developed in which, in the case where a substantial reduction in the engine torque is difficult to achieve, the shift speed is reduced so as to reduce inertia torque, thereby avoiding shift shock (see, for example, Japanese Unexamined Patent Application Publication No. H11-20513).

There has been developed a vehicle in which the throttle characteristics of an engine or the shift characteristics of a continuously variable transmission are switched in accordance with the driving mode, such as a fuel-efficient mode or a high-power mode, to switch the power characteristics of a power unit. In such a vehicle in which the power characteristics are switched in accordance with the driving mode, a range of reduction in shift speed, which is reduced so as to reduce the foregoing inertia torque, also needs to be set in accordance with the driving mode so that a driver does not feel uncomfortable. That is, in order to match the range of reduction in the shift speed with the power characteristics in each driving mode, the range of reduction in the shift speed needs to be preset by experimentation or simulation. However, setting of the range of reduction in the shift speed corresponding to each driving mode involves complicated matching work which results in increased development costs of the vehicle.

SUMMARY OF THE INVENTION

An object of the present invention is to simplify matching work to thereby reduce the development costs of a vehicle.

A vehicle control apparatus of the present invention includes a power unit having an engine and a continuously variable transmission connected to the engine, and a power unit controller for switching the power characteristics of the power unit in accordance with the driving mode. The vehicle control apparatus includes: an engine controller for, when the continuously variable transmission is shifted, increasing or reducing an engine torque in a direction to counteract an inertia torque to be generated on an input side of the continuously variable transmission and allowing the engine to absorb the inertia torque; an inertia torque calculator for calculating an upper limit of the inertia torque to be absorbed by the engine on the basis of an operational state of the engine and a setting state of the driving mode; an upper-limit shift speed setting unit for calculating a shift speed at which the inertia torque of the upper limit is generated and setting an upper-limit shift speed on the basis of the calculated shift speed; and a shift controller for shifting the continuously variable transmission at a shift speed not exceeding the upper-limit shift speed.

Preferably, the inertia torque calculator of the vehicle control apparatus calculates, on the basis of the operational state of the engine, an increase or reduction amount of the engine torque which can be increased or reduced by the engine, may correct the increase or reduction amount on the basis of the setting state of the driving mode, and then may set the corrected increase or reduction amount as the upper limit.

Preferably, the continuously variable transmission of the vehicle control apparatus includes a multi-stage transmission mode in which a plurality of speed ratios are set in stages and switched to perform speed shifting, and the engine controller increases or reduces the engine torque during the speed shifting in the multi-stage transmission mode.

In the vehicle control apparatus of the present invention, the engine control means may reduce the engine torque when the continuously variable transmission is shifted to an acceleration side, and may increase the engine torque when the continuously variable transmission is shifted to a deceleration side.

According to the present invention, the upper limit of the inertia torque to be absorbed by the engine is calculated on the basis of the setting state of the driving mode, and then the upper-limit shift speed during the speed shifting is set on the basis of the upper limit. Hence, shift speed matching power characteristics in each driving mode may easily be set while also suppressing shift shock. This may simplify matching work in a development stage and may reduce development costs of a vehicle.

DESCRIPTION OF THE PREFERRED EMBODIMENT

Figure 1:
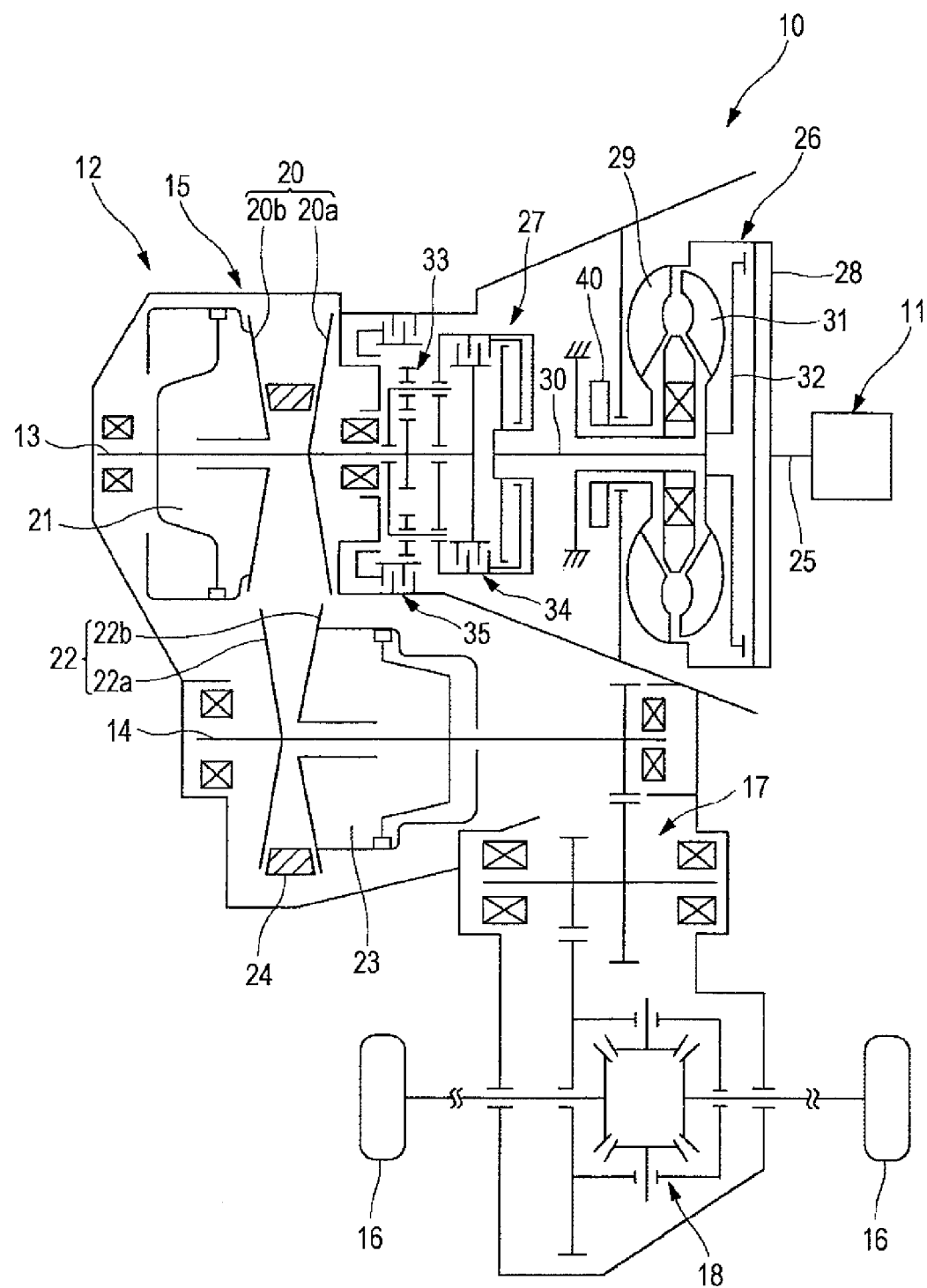
FIG. 1 is a skeleton diagram illustrating a power unit installed in a vehicle.

Embodiments of the present invention will be described in detail below with reference to the accompanying drawings. FIG. 1 is a skeleton diagram illustrating a power unit 10 to be installed in a vehicle. The power unit 10 is controlled by a vehicle control apparatus of an embodiment of the present invention. As illustrated in FIG. 1, the power unit 10 includes an engine 11, which is a power source, and a continuously variable transmission 12 connected to the engine 11. The continuously variable transmission 12 includes a primary shaft 13 driven by the engine 11 and a secondary shaft 14 arranged in parallel with the primary shaft 13. A transmission mechanism 15 is provided between the primary shaft 13 and the secondary shaft 14. A reduction mechanism 17 and a differential mechanism 18 are provided between the secondary shaft 14 and drive wheels 16.

The primary shaft 13 is provided with a primary pulley 20. The primary pulley 20 includes a fixed sheave 20a and a movable sheave 20b. A hydraulic fluid chamber 21 is defined on a back side of the movable sheave 20b. Pressure in the hydraulic fluid chamber 21 is regulated to allow a groove width of the pulley to be changed. The secondary shaft 14 is provided with a secondary pulley 22. The secondary pulley 22 includes a fixed sheave 22a and a movable sheave 22b. A hydraulic fluid chamber 23 is defined on a back side of the movable sheave 22b. Pressure in the hydraulic fluid chamber 23 is regulated to allow a groove width of the pulley to be changed. A drive chain 24 is wrapped around the primary pulley 20 and the secondary pulley 22. The groove widths of the primary and secondary pulleys 20 and 22 are changed to vary winding diameters of the drive chain 24, thereby allowing continuously variable transmission from the primary shaft 13 to the secondary shaft 14.

In order to transmit engine power to such a transmission mechanism 15, a torque converter 26 and a forward/reverse switching mechanism 27 are provided between a crankshaft 25 and the primary shaft 13. The torque converter 26 includes a pump impeller 29 connected to the crankshaft 25 via a front cover 28, and a turbine runner 31 that faces the pump impeller 29 and is connected to a turbine shaft 30. The torque converter 26 is provided with a lock-up clutch 32 that directly connects the crankshaft 25 to the turbine shaft 30. The forward/reverse switching mechanism 27 includes a double-pinion planetary pinion train 33, a forward clutch 34 and a reverse brake 35. The forward clutch 34 and the reverse brake 35 are controlled, thereby allowing switching of a transmission path of engine power.

Figure 2:
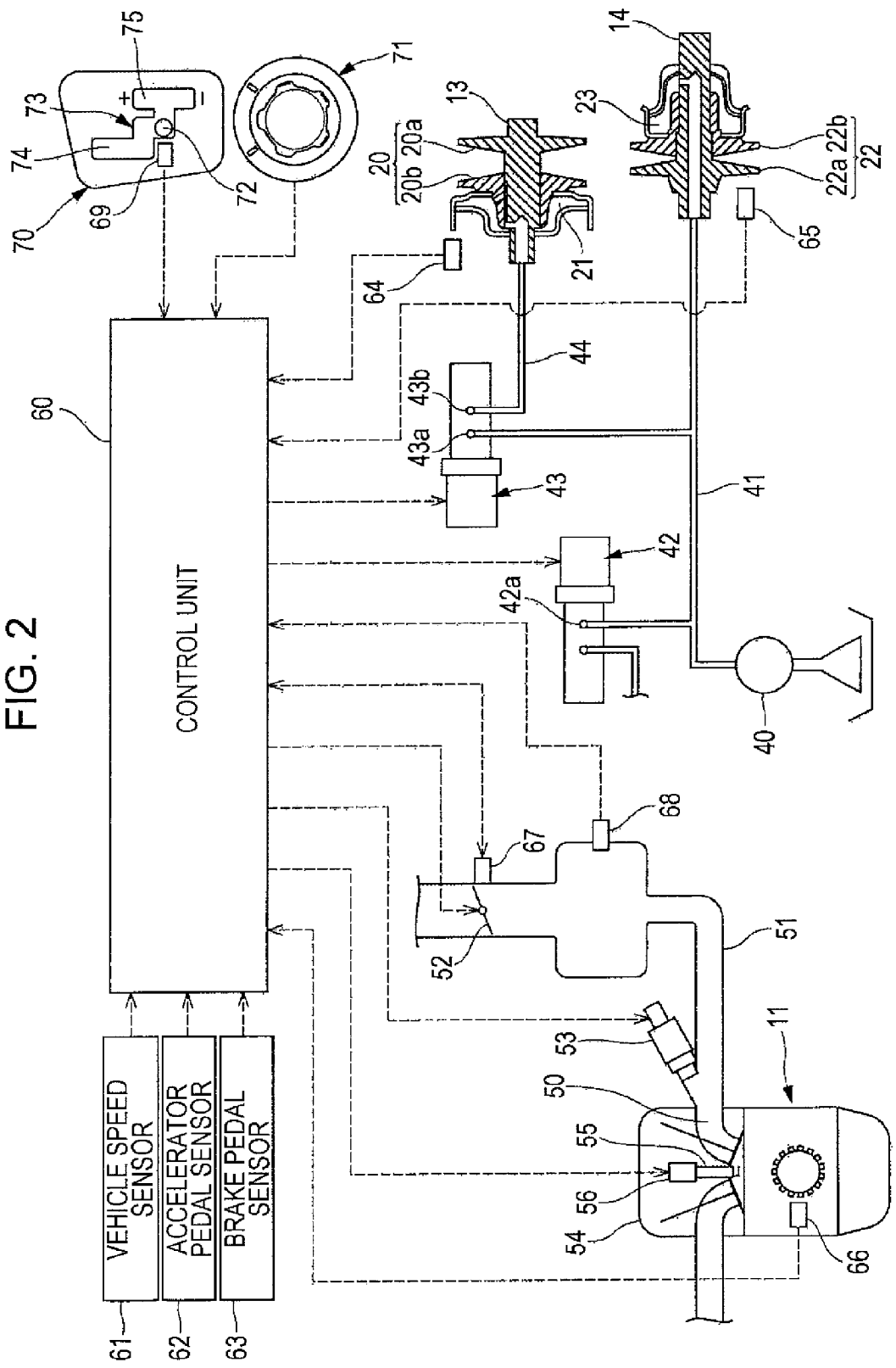
FIG. 2 is a schematic diagram illustrating a control system of the power unit.

FIG. 2 is a schematic diagram illustrating a control system of the power unit 10. As illustrated in FIG. 2, in order to supply hydraulic fluid to the primary pulley 20 and the secondary pulley 22, the power unit 10 is provided with an oil pump 40 driven by, for example, the engine 11. A secondary pressure passage 41 connected to the oil pump 40 is connected to the hydraulic fluid chamber 23 of the secondary pulley 22 and is also connected to a pressure-regulating port 42a of a secondary pressure control valve 42. A secondary pressure as a line pressure is regulated via the secondary pressure control valve 42 on the basis of engine torque, a target speed ratio, and/or the like so that slippage of the drive chain 24 does not occur. The secondary pressure passage 41 is also connected to an input port 43a of a primary pressure control valve 43. A primary pressure passage 44 extending from an output port 43b of the primary pressure control valve 43 is connected to the hydraulic fluid chamber 21 of the primary pulley 20. A primary pressure is regulated via the primary pressure control valve 43 on the basis of the target speed ratio, a target shift speed, a secondary pressure and/or the like so that a groove width of the primary pulley 20 is controlled to achieve a target speed ratio.

As illustrated in FIG. 2, the engine 11 is provided with an intake port 50 to which an intake pipe 51 is connected. The intake pipe 51 is provided with a throttle valve 52 which regulates an amount of intake air, and an injector 53 which injects fuel. A cylinder head 54 is equipped with a spark plug 55 which ignites the air-fuel mixture. An ignition coil 56 which generates a high-voltage current is connected to the spark plug 55. The throttle valve 52, the injector 53, the ignition coil 56, and the like are controlled on the basis of a target engine torque and/or a target engine speed.

A control unit 60 which outputs a control signal to the engine 11 and/or the continuously variable transmission 12 includes a microprocessor (CPU), which is not illustrated. The CPU is connected to a ROM, a RAM, and an I/O port via a bus line. The ROM stores therein a control program and/or various types of map data. The RAM stores therein data arithmetically processed by the CPU. The CPU receives detection signals from various types of sensors via the I/O port. The sensors connected to the control unit 60 include, for example, a vehicle speed sensor 61 for detecting a speed of the vehicle, an accelerator pedal sensor 62 for detecting an operating state of an accelerator pedal (accelerator opening degree), a brake pedal sensor 63 for detecting an operating state of a brake pedal, a primary speed sensor 64 for detecting a rotational speed of the primary pulley 20 (primary speed), a secondary speed sensor 65 for detecting a rotational speed of the secondary pulley 22 (secondary speed), an engine speed sensor 66 for detecting an engine speed, a throttle opening degree sensor 67 for detecting a throttle opening degree of the throttle valve 52, an intake air temperature sensor 68 for detecting a temperature of intake air, and an inhibitor switch 69 for detecting an operating position of a select lever 72, which will be described below. A select lever unit 70, which is manually operated when an operating position or a transmission mode is selected, is also connected to the control unit 60. In addition, a mode selector 71, which is manually operated when a driving mode is selected, is connected to the control unit 60, which serves as the power unit controller for switching the power characteristics of the power unit 10 in accordance with the driving mode. The position of the select lever 72 includes, for example, a drive (D) position, a reverse (R) position, a parking (P) position, and a neutral (N) position. The transmission mode includes, for example, a continuously variable transmission mode in which a speed ratio is continuously changed, and a multi-stage transmission mode in which a speed ratio is changed in stages. The driving mode includes, for example, a fuel-efficient mode in which output of the power unit 10 is suppressed so as to improve fuel efficiency, a high-power mode in which output of the power unit 10 is increased so as to improve power performance, and a normal mode in which both fuel efficiency and power performance are offered.

Shift control of the continuously variable transmission 12 will be described. As described above, the control unit 60 includes the continuously variable transmission mode and the multi-stage transmission mode. These transmission modes are switched in response to operation of the select lever by a driver. As illustrated in FIG. 2, the select lever unit 70 is provided with the select lever 72 which is operated by the driver. A gate 73 to guide the select lever 72 is constituted by a continuously variable transmission gate 74 and a multi-stage transmission gate 75. The continuously variable transmission mode is set by moving the select lever 72 to the continuously variable transmission gate 74. On the other hand, the multi-stage transmission mode is set by moving the select lever 72 to the multi-stage transmission gate 75. The transmission modes may be automatically switched in accordance with preset drive ranges without being switched by operation of the select lever.

Figure 3:
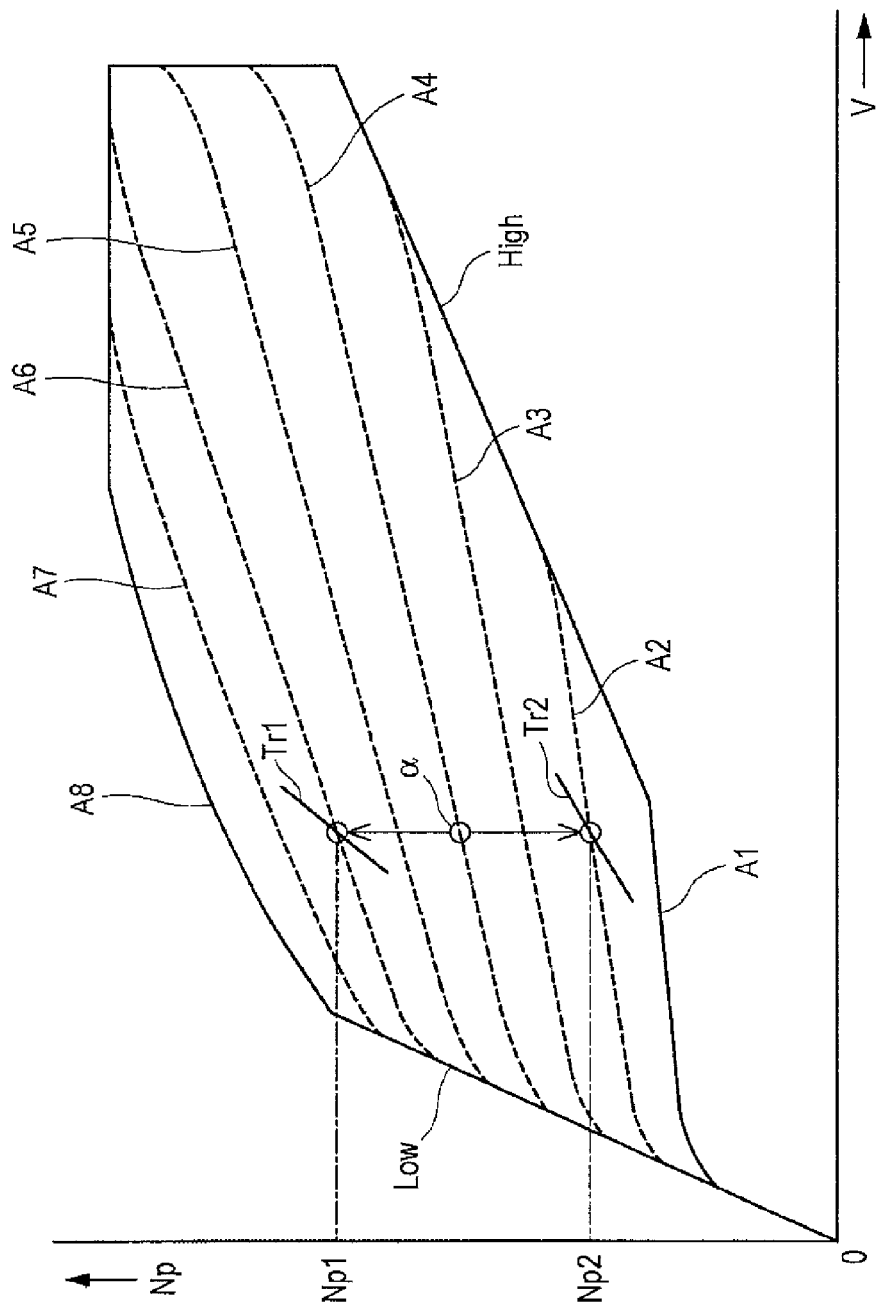
FIG. 3 is an explanatory diagram illustrating an example of a shift characteristic map used in a continuously variable transmission mode.
Figure 4:
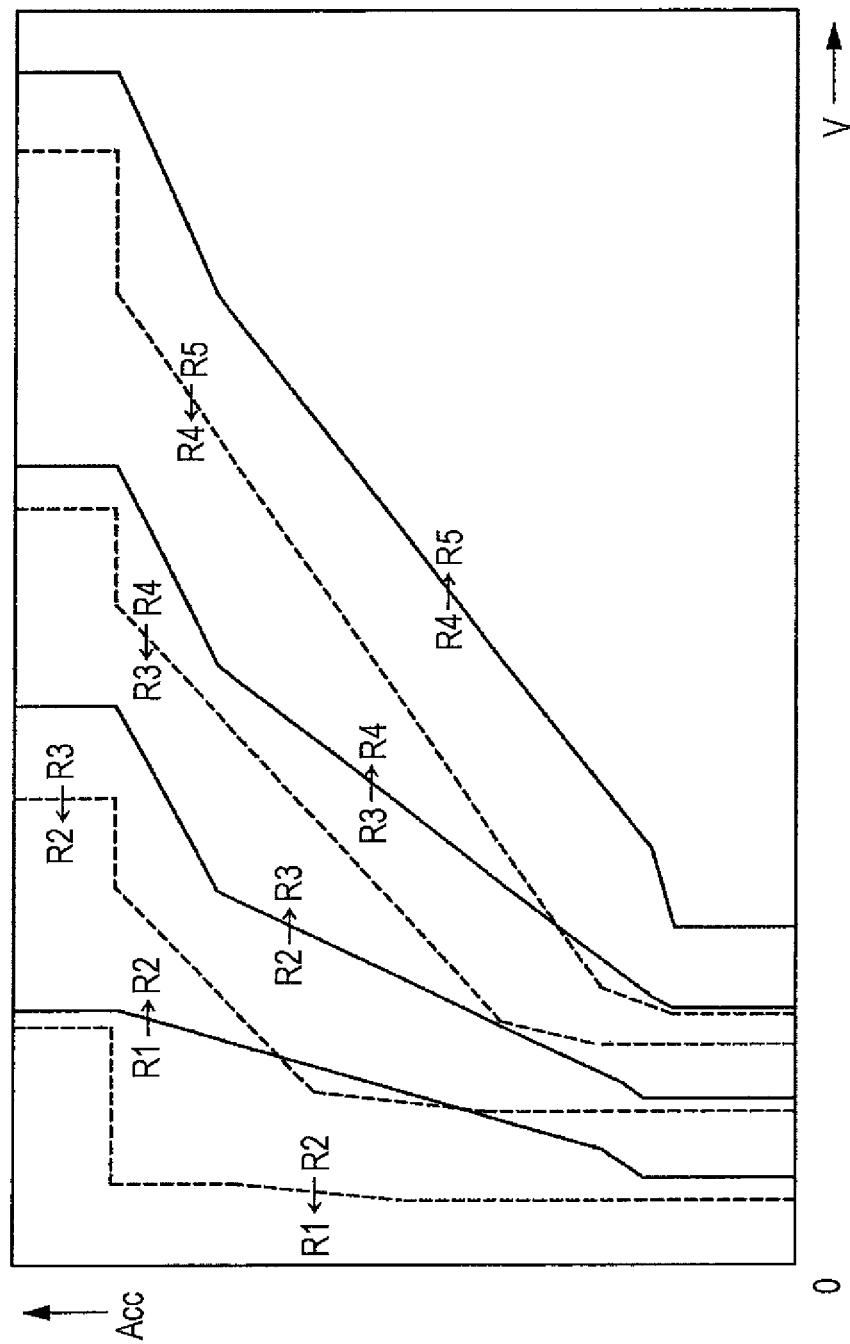
FIG. 4 is an explanatory diagram illustrating an example of a shift pattern used in a multi-stage transmission mode.
Figure 5:
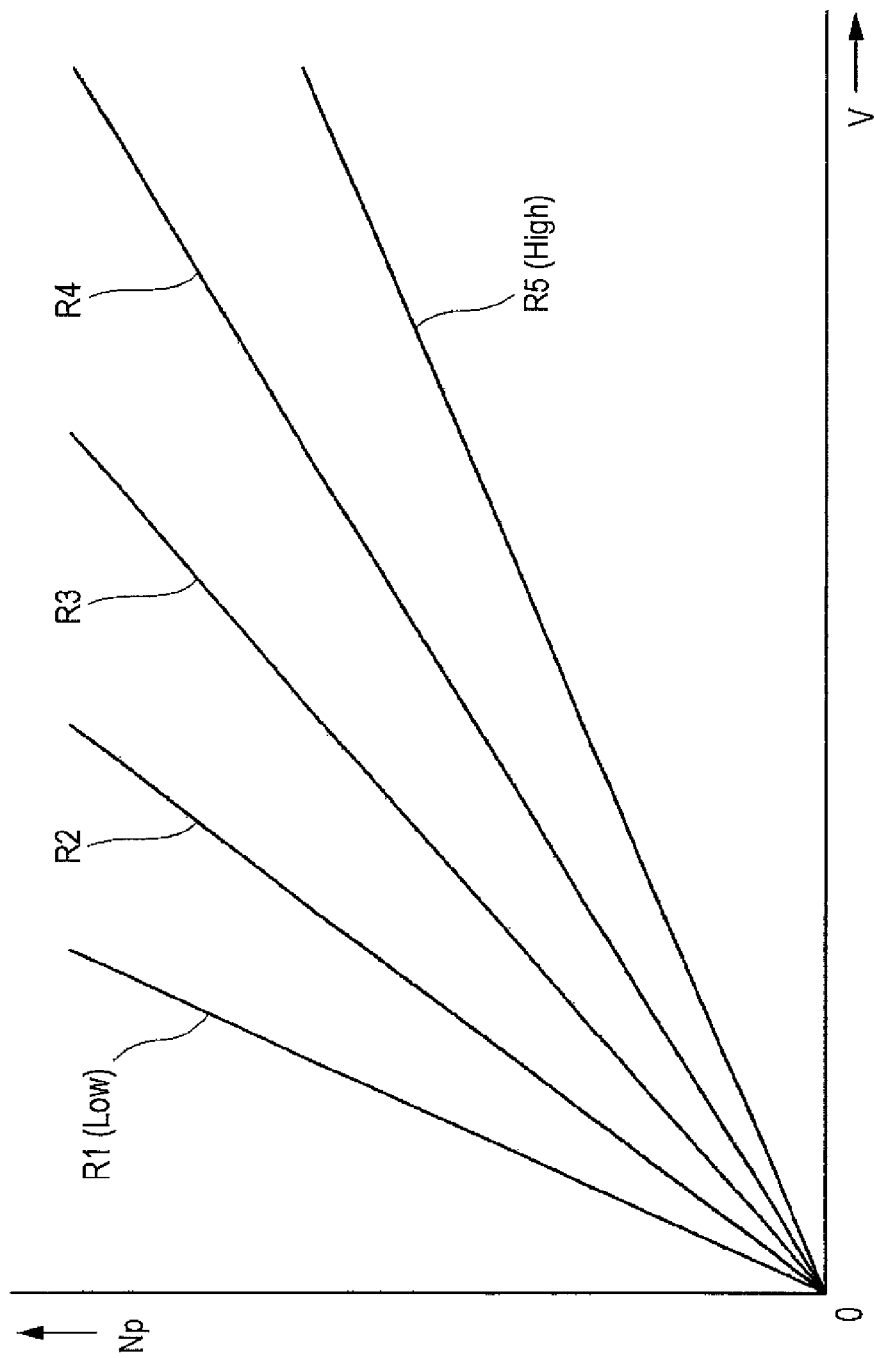
FIG. 5 is an explanatory diagram illustrating an example of speed ratios used in a multi-stage transmission mode.

FIG. 3 is an explanatory diagram illustrating an example of a shift characteristic map used in a continuously variable transmission mode. FIG. 4 is an explanatory diagram illustrating an example of a shift pattern used in a multi-stage transmission mode. FIG. 5 is an explanatory diagram illustrating an example of speed ratios used in a multi-stage transmission mode. When the continuously variable transmission mode is set by operation of the select lever, the control unit 60 refers to the shift characteristic map in FIG. 3 on the basis of a vehicle speed V and an accelerator opening degree Acc, and calculates a target primary speed Np from the shift characteristic map. The control unit 60 calculates a target speed ratio based on the target primary speed Np, and controls a primary pressure Pp and a secondary pressure Ps in accordance with the target speed ratio. As illustrated in FIG. 3, in the shift characteristic map referred to in the continuously variable transmission mode, a characteristic line Low indicating a maximum speed ratio and a characteristic line High indicating a minimum speed ratio are set. Characteristic lines A1 to A8 corresponding to accelerator opening degrees Acc are set between the characteristic lines Low and High. For example, when the accelerator pedal is depressed from a driving state indicated by a reference character α in FIG. 3 to an accelerator opening degree corresponding to the characteristic line A6, Np1 is set as a target primary speed and Tr1 is set as a target speed ratio. When the accelerator pedal is released from the driving state indicated by the reference character α in FIG. 3 to an accelerator opening degree corresponding to the characteristic line A2, Np2 is set as a target primary speed and Tr2 is set as a target speed ratio. Thus, in the continuously variable transmission mode, the target speed ratio is continuously set based on the constantly changing vehicle speed V and the accelerator opening degree Acc.

On the other hand, when the multi-stage transmission mode is set by operation of the select lever, the control unit 60 refers to the shift pattern in FIG. 4 on the basis of a vehicle speed V and an accelerator opening degree Acc, and selects a speed ratio R1, R2, R3, R4, or R5 used for shift control from the shift pattern. As illustrated in FIG. 5, speed ratios R1 to R5 used in the multi-stage transmission mode are preset within a shift range defined between a characteristic line Low and a characteristic line High. As illustrated in FIG. 4, in the shift pattern, upshift lines (solid lines) specifying upshifts between the speed ratios R1 to R5 and downshift lines (dashed lines) specifying downshifts between the speed ratios R1 to R5 are set. When the vehicle speed V and the accelerator opening degree Acc are changed to cross the shift lines, the upshift or downshift between the speed ratios R1 to R5 is performed. Thus, the shift control is performed by switching speed shifting ranges set by the speed ratios R1 to R5. As a result, the same shift feel as that of a manual transmission or the like having five forward drive ranges may be obtained, even in the continuously variable transmission 12.

As illustrated in FIG. 2, in the multi-stage transmission gate 75, the select lever 72 can be moved in forward and backward directions. Operation of the select lever 72 forwards (+direction) allows an upshift, which is speed shifting to a speed-up side, and operation of the select lever 72 backwards (−direction) allows a downshift, which is speed shifting to a speed-down side. Thus, the speed shifting ranges can be switched not only in accordance with the shift pattern in FIG. 4, but also in accordance with operation of the select lever by the driver. In the drawings, the continuously variable transmission 12 has five speed shifting ranges (speed ratios R1 to R5), but the arrangement is not limited to this. The number of the speed shifting ranges may be increased or reduced.

In the multi-stage transmission mode, because the speed ratios R1 to R5 are switched in stages, a shift speed (speed ratio variation per unit time) is higher than that in the continuously variable transmission mode, in which the speed ratio is continuously changed. Specifically, in order to improve speed shifting quality in the multi-stage transmission mode, it is important to increase the shift speed so as to perform quick speed shifting. However, increase in the shift speed of the continuously variable transmission 12 results in a rapid deceleration or a rapid acceleration of the primary pulley 20, which increases inertia torque that acts on an input side of the continuously variable transmission 12 to cause shift shock. Hence, the control unit 60, which constitutes the vehicle control apparatus of the present invention, increases or reduces engine torque in a direction to counteract the inertia torque, thereby allowing the engine 11 to absorb the inertia torque.

Figure 6:
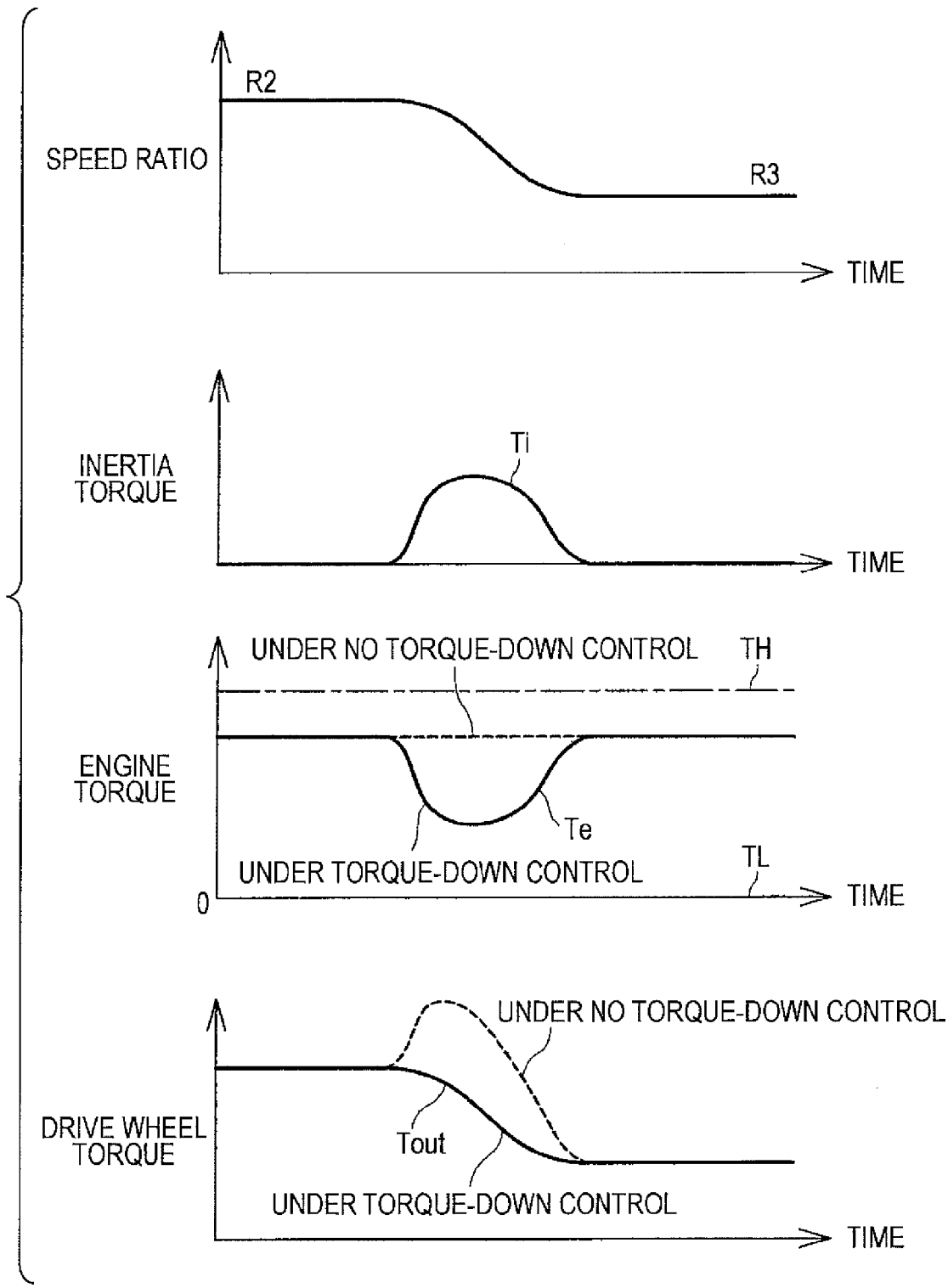
FIG. 6 is an explanatory diagram illustrating a situation in which engine torque is reduced upon upshifting in a multi-stage transmission mode.

FIG. 6 is an explanatory diagram illustrating a situation in which engine torque is reduced upon upshifting in a multi-stage transmission mode. As illustrated in FIG. 6, when the speed ratio is shifted up from R2 to R3 in the multi-stage transmission mode, a primary speed is rapidly reduced to thereby generate an inertia torque Ti due to inertia on the input side of the continuously variable transmission 12. The inertia torque Ti acts in a direction to accelerate the primary pulley 20 (+direction), thereby temporarily increasing a drive wheel torque Tout which is output from the continuously variable transmission 12 to the drive wheels 16, as indicated by a dashed line in FIG. 6. Such a temporary increase in the drive wheel torque Tout gives an occupant an uncomfortable feeling in the form of shift shock. The control unit 60 therefore outputs a control signal to the throttle valve 52 and/or the injector 53, and temporarily reduces an engine torque Te in response to generation of the inertia torque Ti (torque-down control). Thus, a temporary reduction in the engine torque Te by a torque-down amount corresponding to the inertia torque Ti and at the time corresponding thereto allows the engine 11 to absorb the inertia torque Ti. This may suppress the increase in the drive wheel torque Tout to thereby suppress the shift shock. Note that, the inertia torque Ti to be generated on the input side of the continuously variable transmission 12 is inertia torque which is generated in components rotating together With the primary pulley 20. That is, the inertia torque Ti is inertia torque which is generated in, for example, the crankshaft 25, the torque converter 26, the turbine shaft 30, the forward/reverse switching mechanism 27, the primary shaft 13, and the primary pulley 20.

Figure 7:
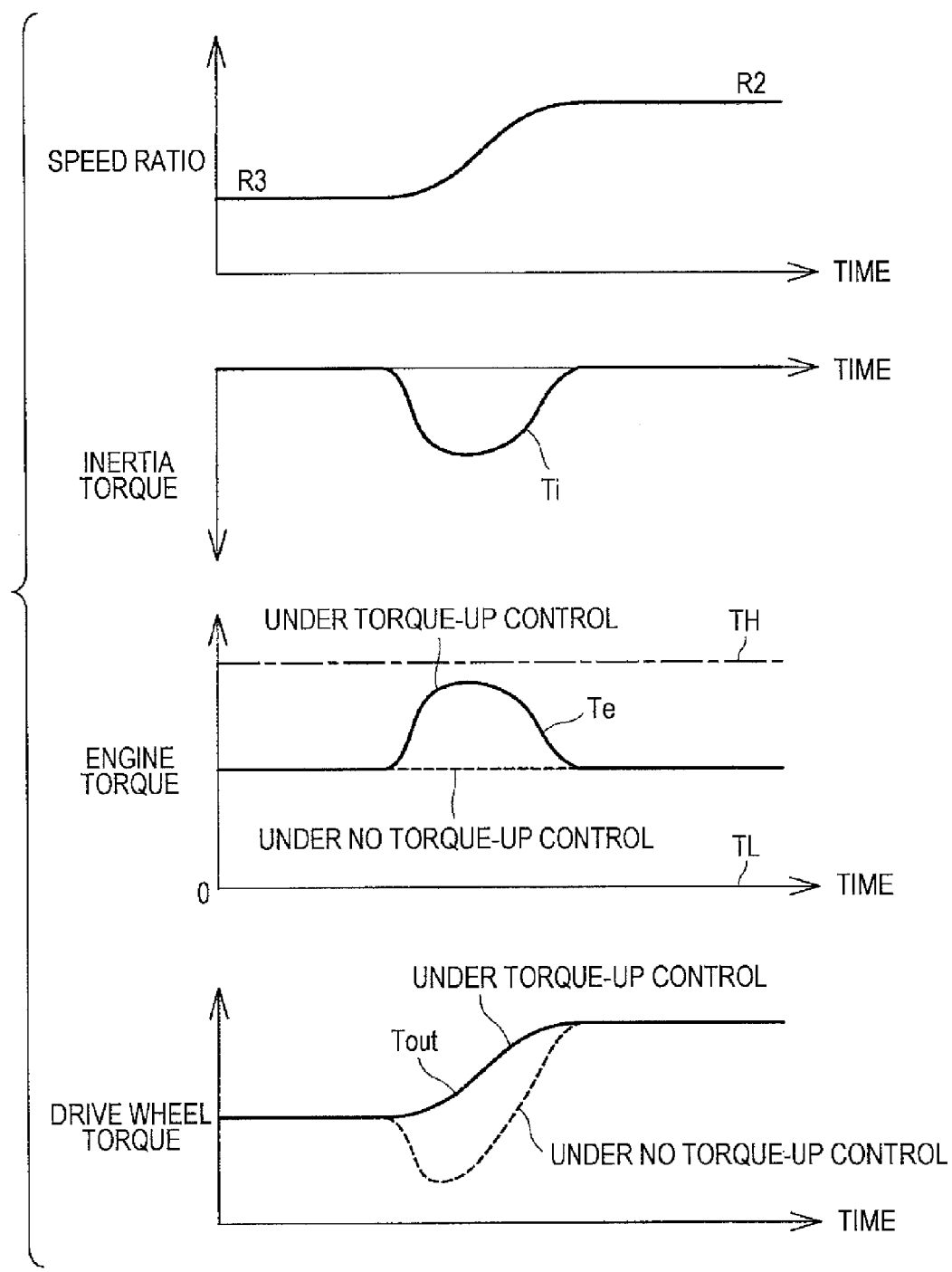
FIG. 7 is an explanatory diagram illustrating a process in which engine torque is increased upon downshifting in a multi-stage transmission mode.

FIG. 7 is an explanatory diagram illustrating a process in which engine torque is increased upon downshifting in a multi-stage transmission mode. As illustrated in FIG. 7, when a speed ratio is shifted down from R3 to R2 in the multi-stage transmission mode, a primary speed is rapidly increased to thereby generate an inertia torque Ti due to inertia on the input side of the continuously variable transmission 12. The inertia torque Ti acts in a direction to decelerate the primary pulley 20 (−direction), which temporarily reduces a drive wheel torque Tout that is output from the continuously variable transmission 12 to the drive wheels 16, as indicated by a dashed line in FIG. 7. Such a temporary reduction in the drive wheel torque Tout gives an occupant an uncomfortable feeling in the form of shift shock. The control unit 60 therefore outputs a control signal to the throttle valve 52 and/or the injector 53, and temporarily increases an engine torque Te in response to generation of the inertia torque Ti (torque-up control). Thus, a temporary increase in the engine torque Te by a torque-up amount corresponding to the inertia torque Ti and at the time corresponding thereto allows the engine 11 to absorb the inertia torque Ti. This may suppress the reduction in the drive wheel torque Tout to thereby suppress the shift shock.

As described above, in the upshift, reduction in the engine torque suppresses the shift shock. However, in a driving state in which engine torque is very small, such as coasting or low-load driving, it is assumed that a torque-down amount sufficient to counteract inertia torque generated during an upshift might not be obtained. Also, in the downshift, increase in the engine torque suppresses the shift shock. However, in a driving state in which engine torque has about a maximum value, such as high-load driving, it is assumed that a torque-up amount sufficient to counteract inertia torque generated during a downshift might not be obtained. Thus, when a torque increase or reduction amount (torque-down/up amount) sufficient to counteract the inertia torque is not obtained, shift speed needs to be reduced so as to reduce the inertia torque.

Furthermore, the shift speed needs to be set in accordance with the power characteristics in each driving mode described above so that the driver does not feel uncomfortable. That is, quick speed shifting at a high shift speed, in spite of a fuel-efficient mode having been selected as the driving mode, is inconsistent with slow power characteristics in the fuel-efficient mode and thus gives the driver an uncomfortable feeling. Similarly, slow speed shifting at a low shift speed, in spite of a high-power mode having been selected as the driving mode, is inconsistent with quick power characteristics in the high-power mode and thus gives the driver an uncomfortable feeling. Hence, the control unit 60 sets an upper-limit shift speed so as to satisfy both the torque increase or reduction amount of the engine 11 and the power characteristics in each driving mode, and performs shift control of the continuously variable transmission 12 at a shift speed not exceeding the upper-limit shift speed.

Figure 8:
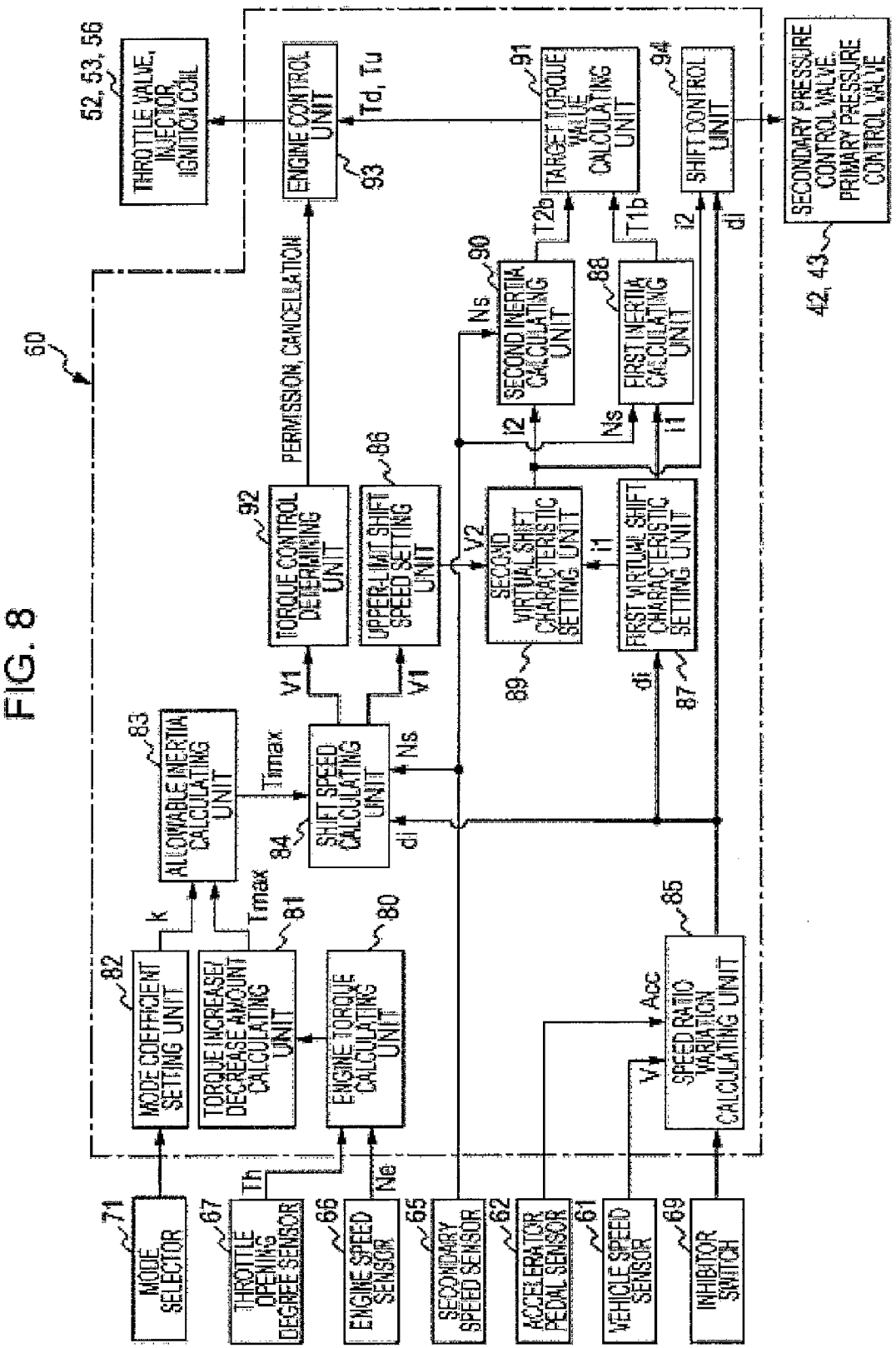
FIG. 8 is a block diagram illustrating an engine control system and a shift control system of a control unit.

FIG. 8 is a block diagram illustrating an engine control system and a shift control system of the control unit 60. As illustrated in FIG. 8, the control unit 60 includes an engine torque calculating unit 80, a torque increase/decrease amount calculating unit 81, a mode coefficient setting unit 82, an allowable inertia calculating unit 83, a shift speed calculating unit 84, and a speed ratio variation calculating unit 85. The engine torque calculating unit 80 refers to a predetermined map on the basis of a throttle opening degree Th and an engine speed Ne, and calculates a current developing engine torque Te. Subsequently, the torque increase/decrease amount calculating section (inertia torque calculator) 81 calculates a torque increase or decrease amount (increase or reduction amount) Tmax based on the engine torque Te. The torque increase or decrease amount Tmax is, in an upshift, a difference between the developing engine torque Te and a maximum torque TH which can be increased, and in a downshift, a difference between the developing engine torque Te and a minimum torque TL which can be reduced. That is, the torque increase or decrease amount Tmax is an engine torque amount which can be increased or decrease from the current moment. In FIGS. 6 and 7, each minimum torque TL is set to 0, but the value is not limited to this. The minimum torque TL may be set to 0 or less.

Figure 9:
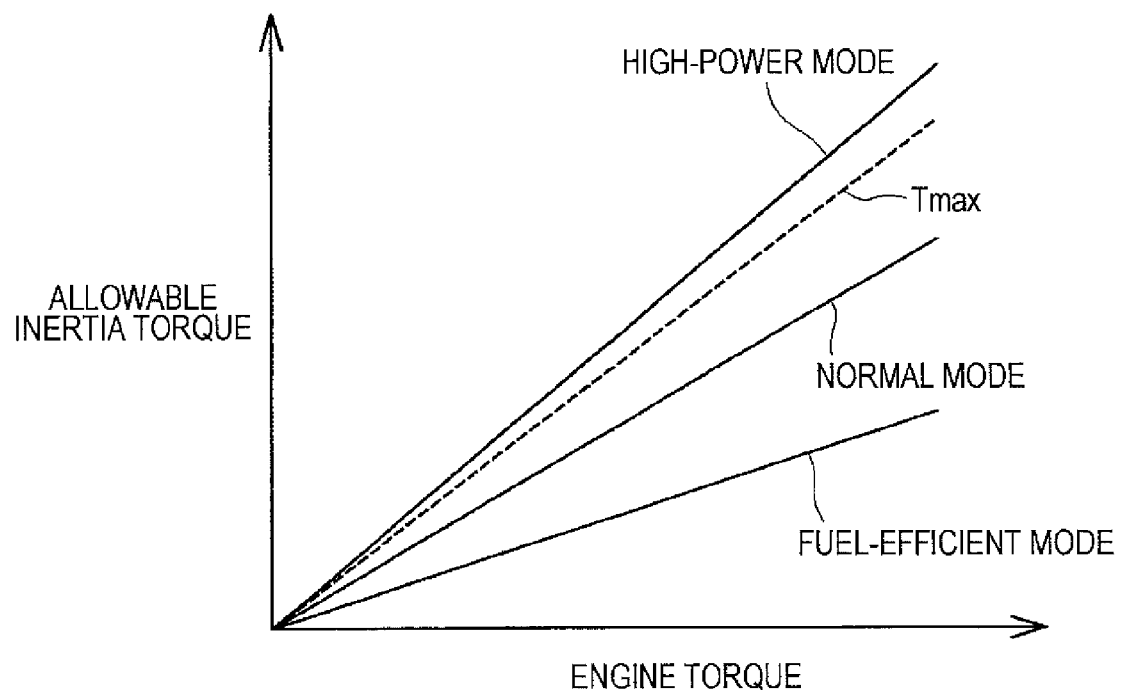
FIG. 9 is a diagram illustrating an allowable inertia torque in each driving mode.

The mode coefficient setting unit (inertia torque calculator) 82 sets a mode coefficient k corresponding to each driving mode based on an operating state of the mode selector 71 by the driver. For example, the mode coefficient k is set to 1.1 when a high-power mode is selected, the mode coefficient k is set to 0.8 when a normal mode is selected, and the mode coefficient k is set to 0.6 when a fuel-efficient mode is selected. Then, the allowable inertia calculating section (inertia torque calculating means) 83 multiplies the torque increase or decrease amount Tmax by the mode coefficient k to calculate an allowable inertia torque (upper limit) Timax. Here, FIG. 9 is a diagram illustrating the allowable inertia torque Timax in each driving mode. As illustrated in FIG. 9, there are calculated an allowable inertia torque Timax in a high-power mode above the torque increase or decrease amount Tmax, an allowable inertia torque Timax in a normal mode below the torque increase or decrease amount Tmax, and an allowable inertia torque Timax in a fuel-efficient mode below that in the normal mode. The mode coefficients are not limited to the foregoing values. For example, by setting the mode coefficient in the high-power mode to 1.0 or less, an allowable inertia torque Timax in the high-power mode less than or equal to the torque increase or reduction amount Tmax may be calculated.

The shift speed calculating unit (upper-limit shift speed setting unit) 84 calculates, on the basis of the following equation (1), an angular acceleration α of the primary pulley 20 at which the allowable inertia torque Timax is generated during speed shifting. A reference character I in the equation (1) denotes a moment of inertia of each component on the input side of the continuously variable transmission 12 on which the foregoing inertia torque acts. Subsequently, the shift speed calculating unit 84 calculates, based on a reduction speed ratio and the moment of inertia of each component, a shift speed V1 of the continuously variable transmission 12 at which the inertia torque to be generated becomes equal to the allowable inertia torque Timax during the speed shifting. A speed ratio variation di is a speed ratio variation before and after the speed shifting calculated by the speed ratio variation calculating unit 85. For example, in FIG. 6, a speed ratio before speed shifting is R2 and a speed ratio after the speed shifting is R3. Accordingly, the speed ratio variation di is (R2−R3).

$$\alpha = Timax/I \quad (1)$$

As illustrated in FIG. 8, the control unit 60 includes an upper-limit shift speed setting unit 86, a first virtual shift characteristic setting unit 87, a first inertia calculating unit 88, a second virtual shift characteristic setting unit 89, a second inertia calculating unit 90, a target torque value calculating unit 91, a torque control determining unit 92, an engine control unit 93, and a shift control unit 94. The upper-limit shift speed setting unit (upper-limit shift speed setting unit) 86 applies a predetermined upper limit Vmax and a predetermined lower limit Vmin to the shift speed V1 to set an upper-limit shift speed V2 to be used for shift control. That is, when the shift speed V1 is a value in the range of the predetermined lower limit Vmin to the predetermined upper limit Vmax, the upper-limit shift speed V2 is set to the shift speed V1. When the shift speed V1 is below the predetermined lower limit Vmin, the upper-limit shift speed V2 is set to the predetermined lower limit Vmin. When the shift speed V1 is above the predetermined upper limit Vmax, the upper-limit shift speed V2 is set to the predetermined upper limit Vmax. Thus, the upper-limit shift speed V2 is set between the predetermined lower limit Vmin and the predetermined upper limit Vmax, and is input to the second virtual shift characteristic setting unit 89, which will be described below. Then, the second virtual shift characteristic setting unit 89 sets a shift characteristic not exceeding the upper-limit shift speed V2. The shift control unit (shift controller) 94 which receives the shift characteristic performs shift control of the continuously variable transmission 12 at a shift speed not exceeding the upper-limit shift speed V2.

Figure 10:
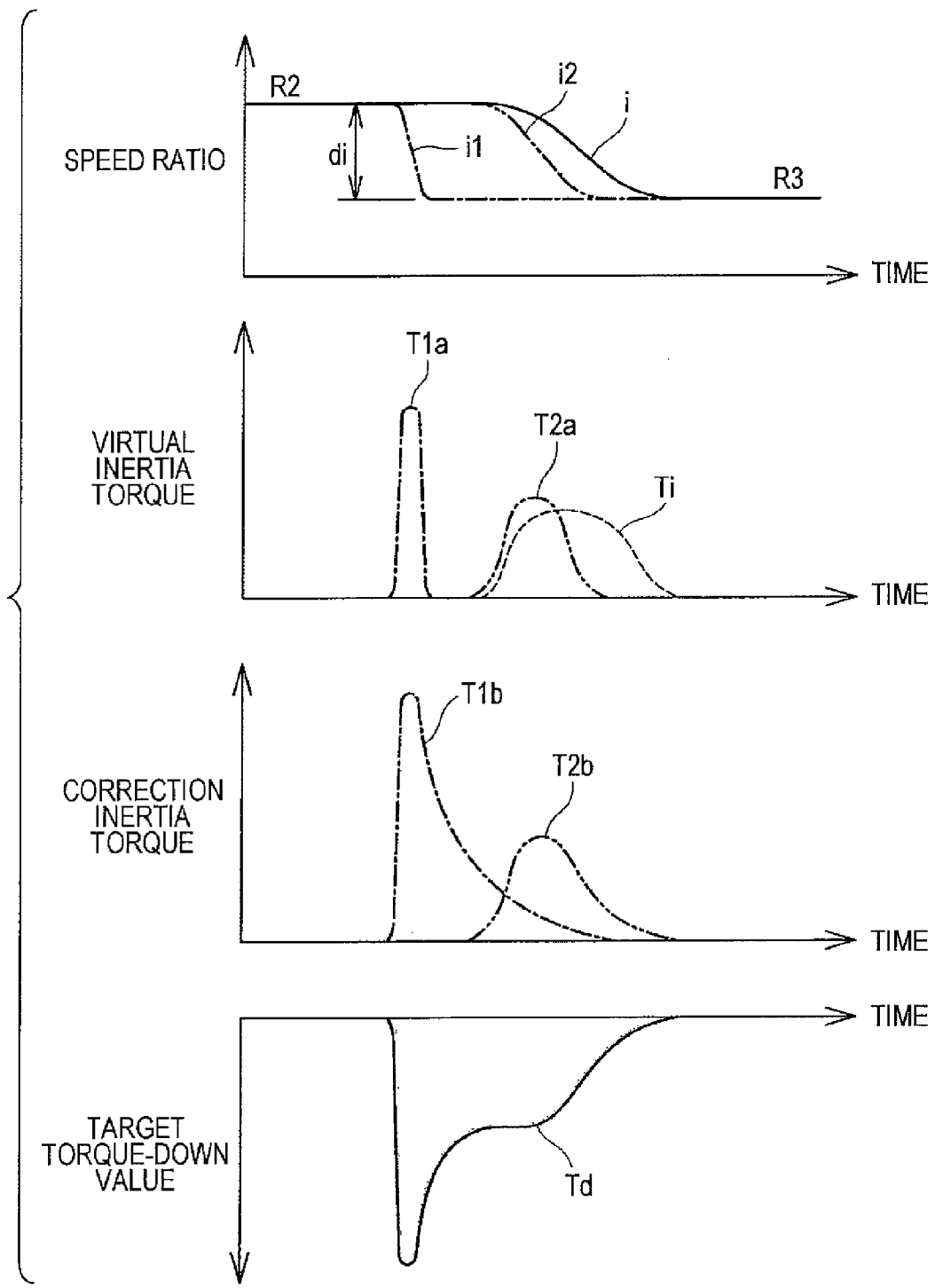
FIG. 10 is an explanatory diagram illustrating a process of calculating a target torque-down value.
Figure 11:
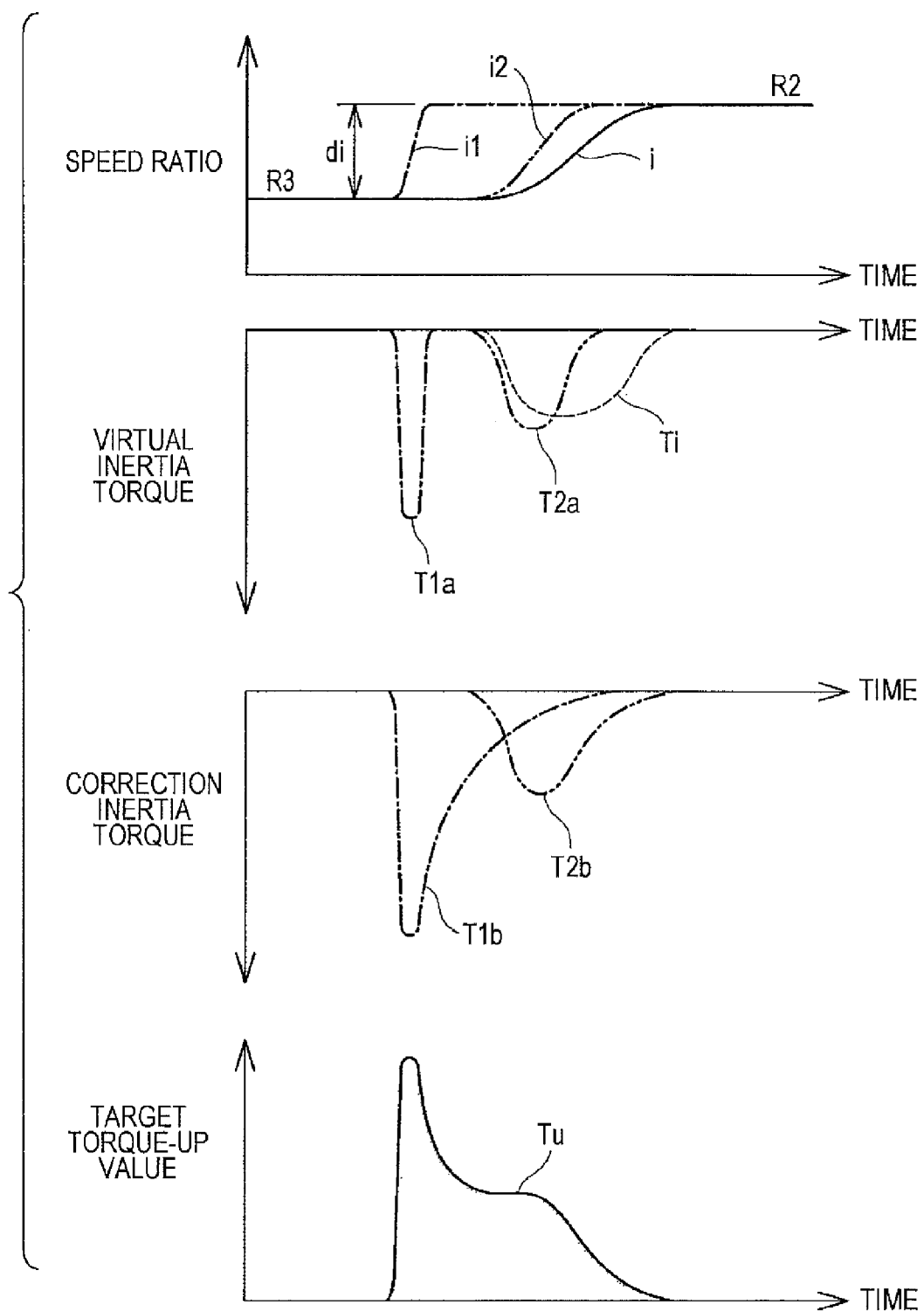
FIG. 11 is an explanatory diagram illustrating a process of calculating a target torque-up value.

In order to increase or decrease engine torque during the speed shifting, procedures for calculating a target torque-down value and a target torque-up value, which are output to the engine 11, will be described. FIG. 10 is an explanatory diagram illustrating a process of calculating the target torque-down value. FIG. 11 is an explanatory diagram illustrating a process of calculating the target torque-up value. As illustrated in FIG. 8, the first virtual shift characteristic setting unit 87 sets a first virtual shift characteristic i1 based on the speed ratio variation di. As illustrated in FIGS. 10 and 11, the first virtual shift characteristic i1 is a shift speed characteristic, such as a quick shift of a speed ratio from R2 (or R3) to R3 (or R2).

The first inertia calculating unit 88 calculates a first virtual inertia torque T1a to be generated on the input side of the continuously variable transmission 12 during speed shifting in the continuously variable transmission 12 with the first virtual shift characteristic i1. The first virtual inertia torque T1a is calculated on the basis of a shift speed of the first virtual shift characteristic i1, the secondary speed Ns, and the moment of inertia I on the input side of the continuously variable transmission 12. Subsequently, with a response lag of the engine 11 taken into account, the first inertia calculating unit 88 multiplies the first virtual inertia torque T1a by a predetermined coefficient, and then carries out a predetermined filtering process to calculate a first correction inertia torque T1b. As illustrated in FIGS. 10 and 11, with the response lag of the engine 11 taken into account, a filtering process, such as a temporary delay process, is not carried out for a certain period of time after generation of the first virtual inertia torque T1a.

The second virtual shift characteristic setting unit 89 carries out a predetermined filtering process for the first virtual shift characteristic i1 and thereby sets a second virtual shift characteristic i2 of a shift speed lower than that of the first virtual shift characteristic i1. Also, the upper-limit shift speed V2 is input from the upper-limit shift speed setting unit 86 to the second virtual shift characteristic setting unit 89. The second virtual shift characteristic setting section 89 sets a second virtual shift characteristic i2 of a shift speed not exceeding the upper-limit shift speed V2. As illustrated in FIGS. 10 and 11, in view of the responsiveness of the shift control system, the second virtual shift characteristic i2 is a shift speed characteristic that can be realistically instructed. The second virtual shift characteristic i2 is input to the shift control unit 94. The shift control unit 94 outputs a control signal to the primary pressure control valve 43 and/or the secondary pressure control valve 42 so that shift control is performed in accordance with the second virtual shift characteristic i2. A speed ratio i indicated by each solid line in FIGS. 10 and 11 is an actual speed ratio at which the continuously variable transmission 12 is actually controlled when the shift control is performed in accordance with the second virtual shift characteristic i2.

The second inertia calculating unit 90 calculates a second virtual inertia torque T2a to be generated on the input side of the continuously variable transmission 12 when the continuously variable transmission 12 is shifted at the second virtual shift characteristic i2. The second virtual inertia torque T2a is calculated on the basis of a shift speed of the second virtual shift characteristic i2, the secondary speed Ns, and the moment of inertia I on the input side of the continuously variable transmission 12. Subsequently, with an amount of absorption of inertia torque taken into account, the second inertia calculating unit 90 multiplies the second virtual inertia torque T2a by a predetermined coefficient, and then carries out a predetermined filtering process to calculate a second correction inertia torque T2b. The predetermined coefficient and filtering process, when the second virtual inertia torque T2a is calculated, are appropriately set with a driving state of the vehicle taken into account.

The target torque value calculating unit 91 calculates, on the basis of the first correction inertia torque T1b and the second correction inertia torque T2b, a target torque-down value Td in an upshift and a target torque-up value Tu in a downshift. As illustrated in FIGS. 10 and 11, the target torque-down value Td and the target torque-up value Tu are calculated by adding the first correction inertia torque T1b and the second correction inertia torque T2b and then carrying out on the resultant value a predetermined filtering process by which fluctuations in the value are smoothed. The target torque-down value Td and the target torque-up value Tu are output from the target torque value calculating unit 91 to the engine control unit 93. The engine control unit (engine controller) 93 drives and controls the throttle valve 52 and/or the injector 53 in accordance with the target torque-down value Td and the target torque-up value Tu so as to increase or decrease the engine torque in a direction to counteract the inertia torque to be generated during the speed shifting. This allows the engine 11 to absorb the inertia torque during the speed shifting to thereby suppress excessive fluctuations in the drive wheel torque, so that shift shock may be avoided.

In a driving state such as low-load driving in which engine torque is very small, decrease in the engine torque in accordance with an upshift may disturb the vehicle behavior. When the shift speed V1 is the predetermined lower limit Vmin or more, the torque control determining unit 92 of the control unit 60 outputs a torque-down enable signal to the engine control unit 93. The decrease in the engine torque by the engine control unit 93 is thus permitted. On the other hand, when the shift speed V1 is below the predetermined lower limit Vmin, the torque control determining unit 92 outputs a torque-down cancellation signal to the engine control unit 93. The decrease in the engine torque by the engine control unit 93 is thus cancelled. That is, when an allowable inertia torque Timax is calculated and is a small value because of a very small engine torque Te and the shift speed V1 is below the predetermined lower limit Vmin, the decrease in the engine torque is cancelled so as to suppress the disturbance of the vehicle behavior.

As described above, the allowable inertia torque Timax is calculated on the basis of the operational state of the engine 11 and the setting state of each driving mode, and then the upper-limit shift speed V2 is set on the basis of the allowable inertia torque Timax. Hence, shift speed matching power characteristics in each driving mode may easily be set while also suppressing the shift shock. That is, in order to suppress the shift shock, it is necessary to increase or decrease the engine torque and to regulate the shift speed. Also, the shift speed needs to be set corresponding to the power characteristics in each driving mode so that the driver does not feel uncomfortable. Thus, in order to obtain the shift speed matching the power characteristics in each driving mode while suppressing the shift shock, map data of shift speeds have needed to be created in advance with respect to various parameters. In contrast, in the vehicle control apparatus of the present invention, the allowable inertia torque Timax is calculated on the basis of the operational state of the engine 11 and the setting state of each driving mode, the upper-limit shift speed V2 is set based on the allowable inertia torque Timax, and then the continuously variable transmission 12 is shifted at a shift speed not exceeding the upper-limit shift speed V2. This eliminates the need for the creation of the map data of the shift speeds in a development stage and may reduce development costs.

Figure 12:
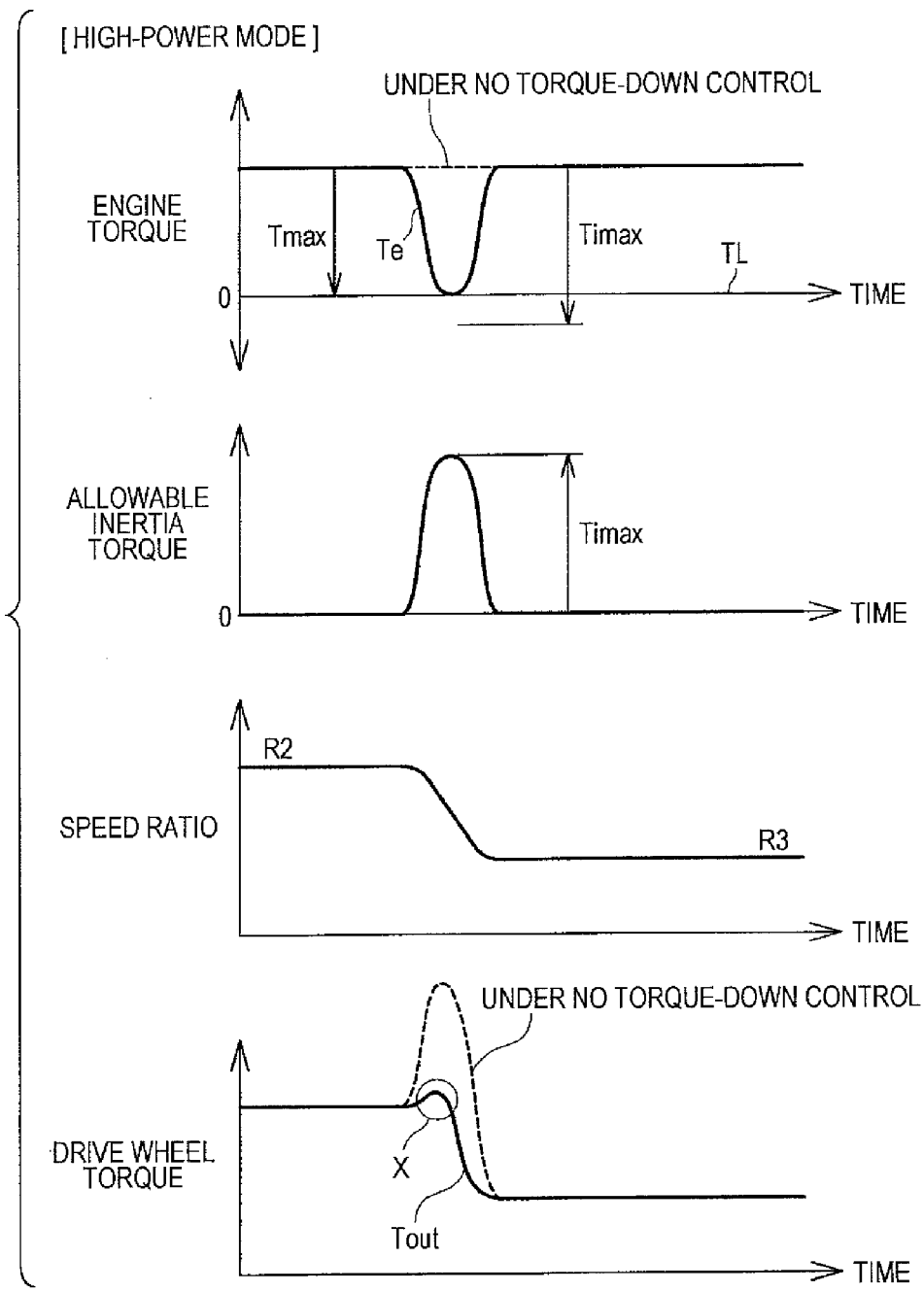
FIG. 12 is an explanatory diagram illustrating torque-down control upon upshifting in a high-power mode.
Figure 13:
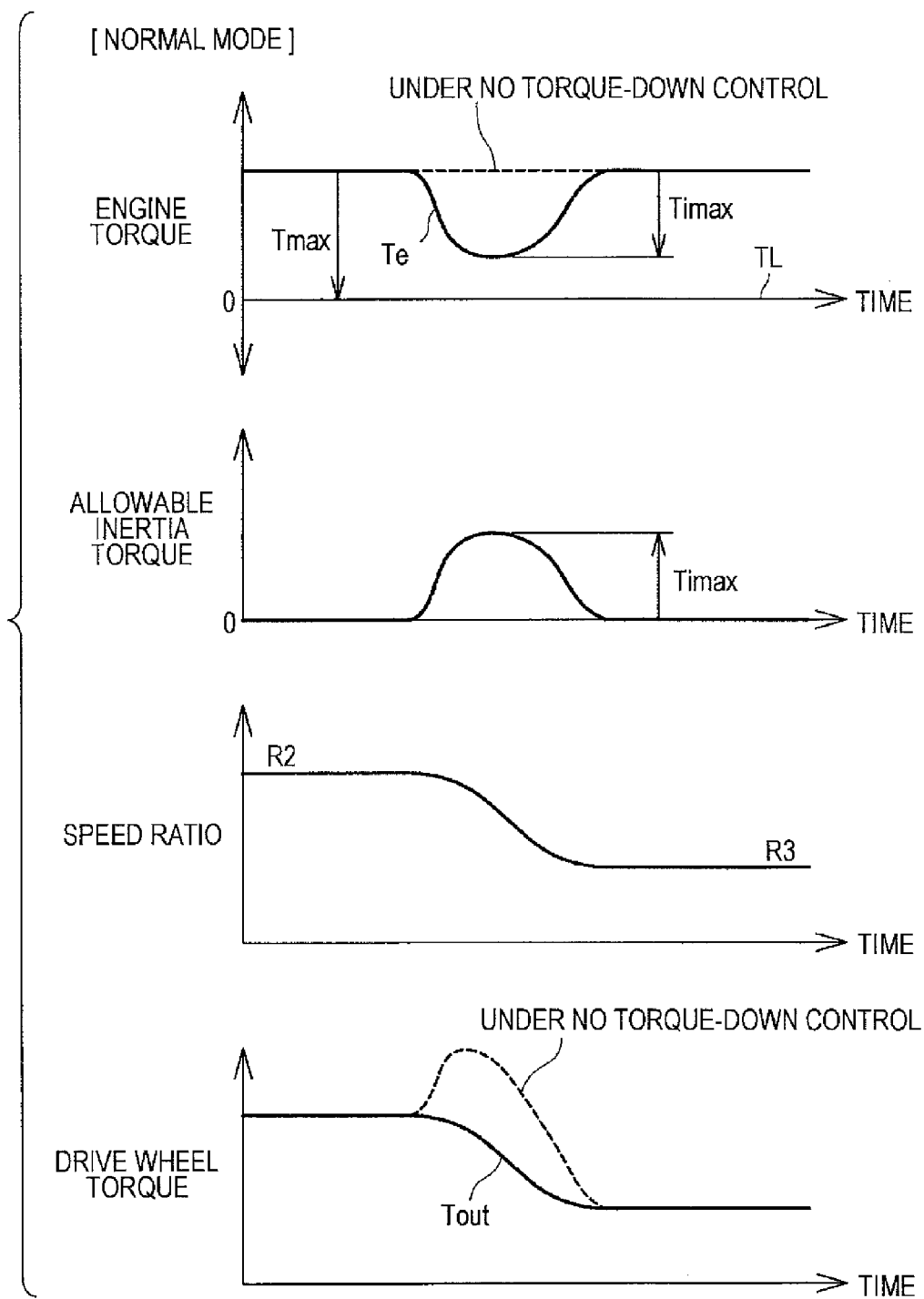
FIG. 13 is an explanatory diagram illustrating torque-down control upon upshifting in a normal mode.
Figure 14:
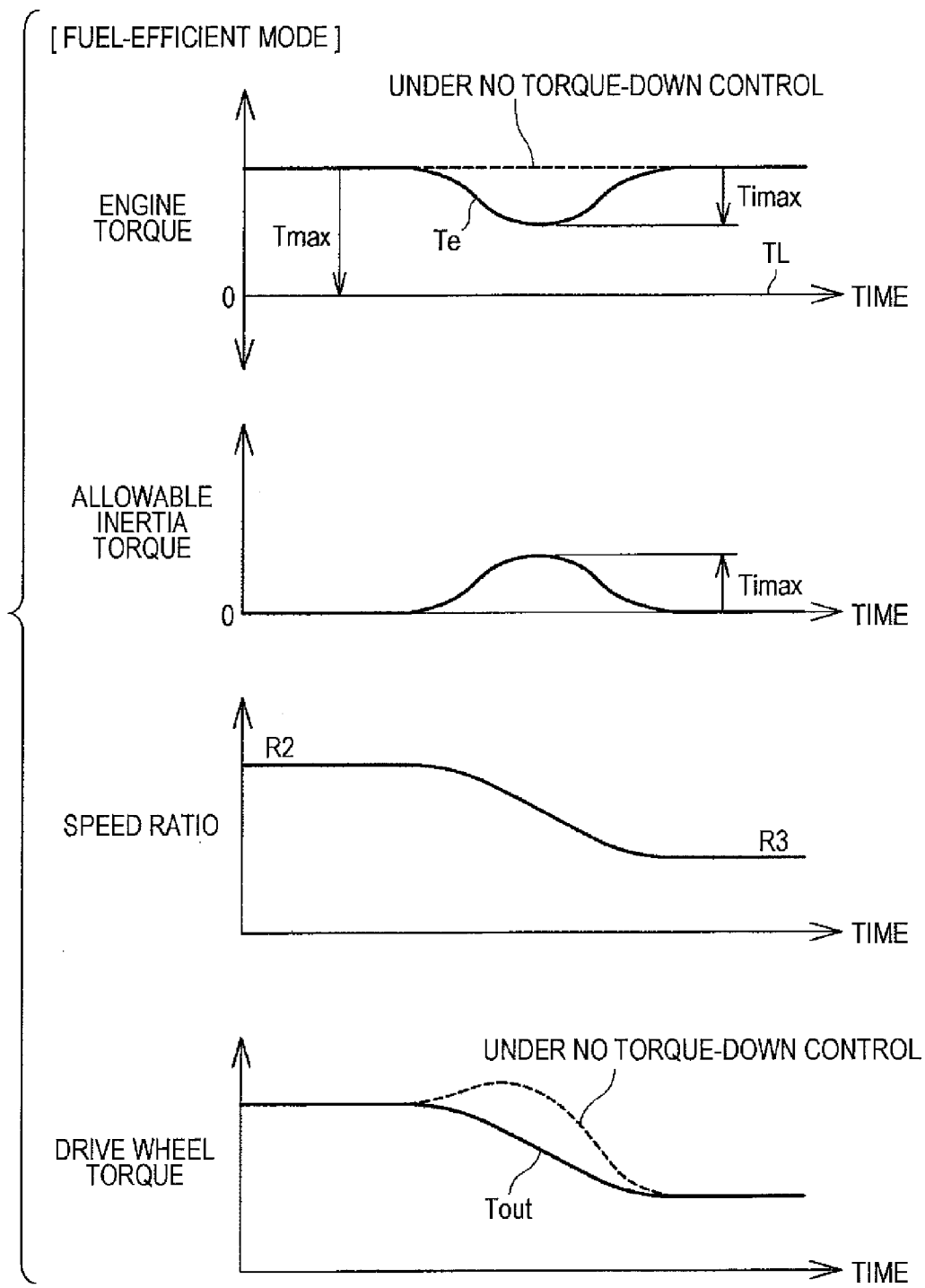
FIG. 14 is an explanatory diagram illustrating torque-down control upon upshifting in a fuel-efficient mode.
Figure 15:
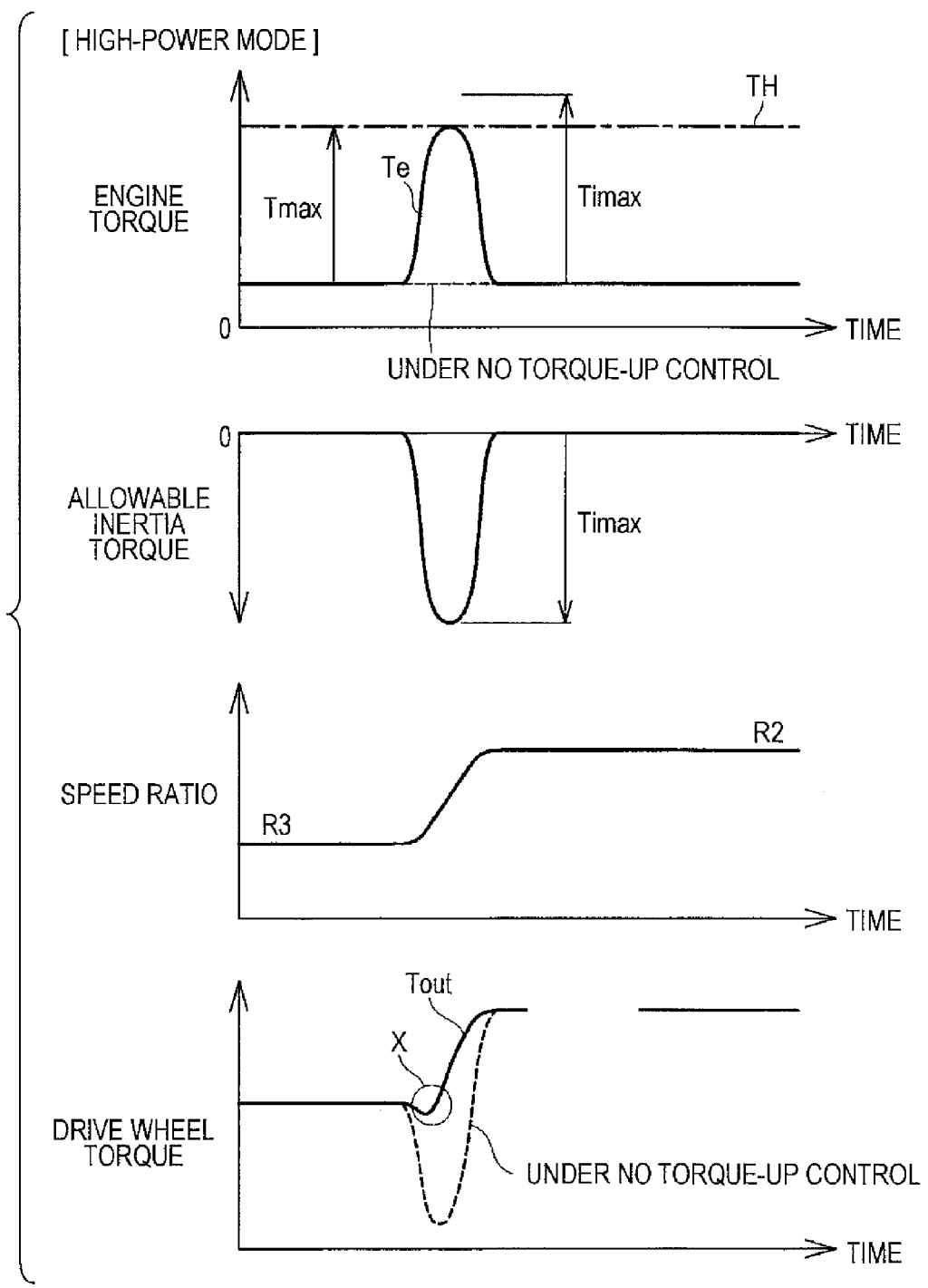
FIG. 15 is an explanatory diagram illustrating torque-up control upon downshifting in a high-power mode.
Figure 16:
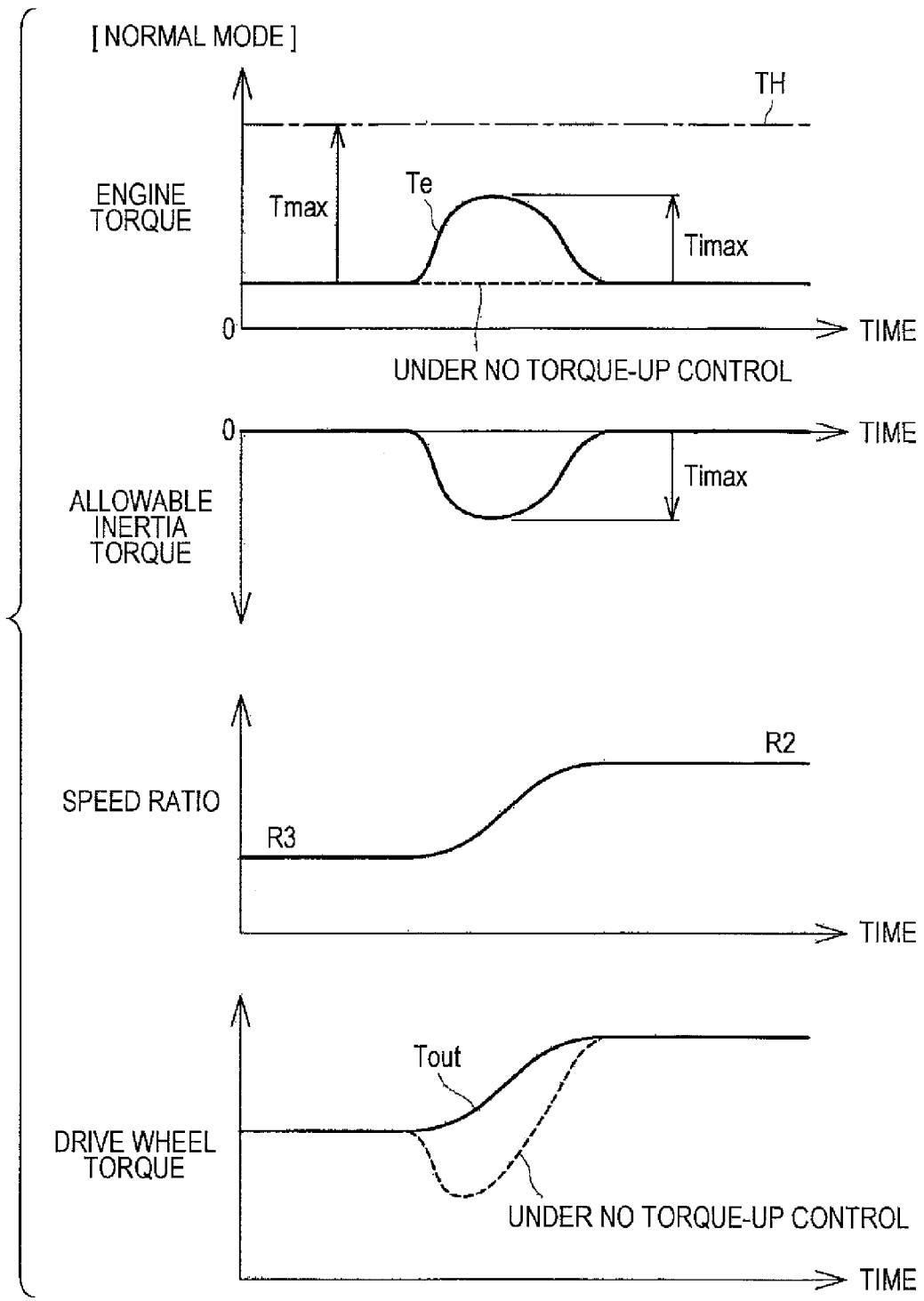
FIG. 16 is an explanatory diagram illustrating torque-up control upon downshifting in a normal mode.
Figure 17:
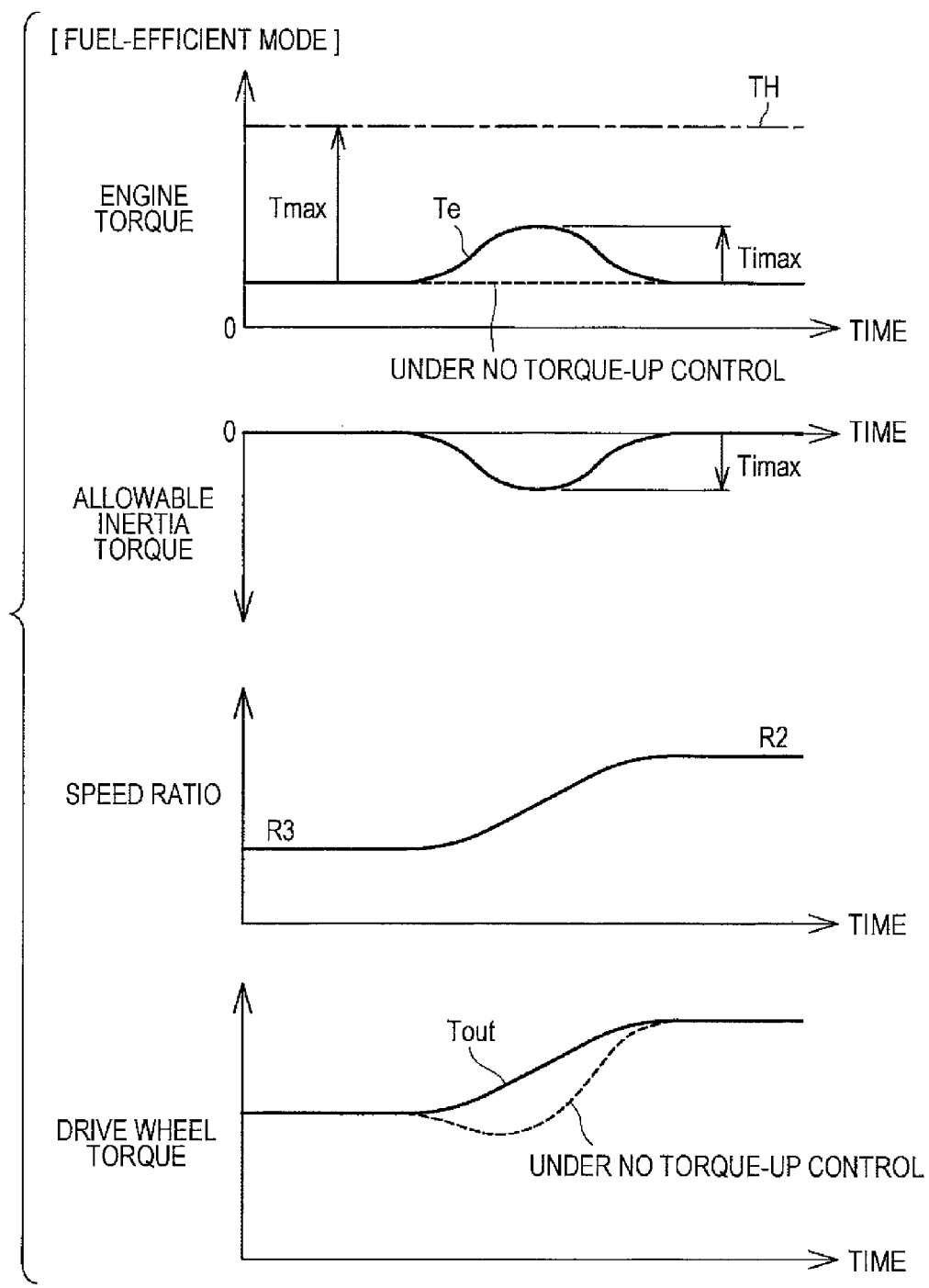
FIG. 17 is an explanatory diagram illustrating torque-up control upon downshifting in a fuel-efficient mode.

Torque-down control and torque-up control during speed shifting will be described with reference to the drawings. FIGS. 12, 13, and 14 are explanatory diagrams illustrating torque-down control upon upshifting in a high-power mode, a normal mode, and a fuel-efficient mode, respectively. FIGS. 15, 16, and 17 are explanatory diagrams illustrating torque-up control upon downshifting in a high-power mode, a normal mode, and a fuel-efficient mode, respectively.

The torque-down control performed upon upshifting will be described. As illustrated in FIGS. 12 to 14, operational states of the engine 11 (output engine torques Te) are the same. Also, torque increase or decrease amounts Tmax of the engine 11 are the same. Even in the case where the torque increase or decrease amounts Tmax are the same, when the driving modes differ from one another, allowable inertia torques Timax calculated decrease in the order of the high-power mode, the normal mode, and the fuel-efficient mode. Also, upper-limit shift speeds V2 calculated from the allowable inertia torques Timax decrease in the order of the high-power mode, the normal mode, and the fuel-efficient mode. Accordingly, shift speeds during the upshift are controlled so that shift speed decreases in the order of the high-power mode, the normal mode, and the fuel-efficient mode. The engine torques Te are each temporarily reduced by an amount equivalent to that of each allowable inertia torque Timax. Thus, variation of the allowable inertia torque Timax according to each driving mode allows the upshift of the continuously variable transmission 12 at the shift speed matching power characteristics in each driving mode while suppressing shift shock.

The torque-up control performed upon downshifting will be described. As illustrated in FIGS. 15 to 17, operational states of the engine 11 (output engine torques Te) are the same. Also, torque increase or decrease amounts Tmax of the engine 11 are the same. Even in the case where the torque increase or decrease amounts Tmax are the same, when the driving modes differ from one another, allowable inertia torques Timax calculated decrease in the order of the high-power mode, the normal mode, and the fuel-efficient mode. Also, upper-limit shift speeds V2 calculated from the allowable inertia torques Timax decrease in the order of the high-power mode, the normal mode, and the fuel-efficient mode. Accordingly, shift speeds during the downshift are controlled so that shift speed decreases in the order of the high-power mode, the normal mode, and the fuel-efficient mode. The engine torques Te are each temporarily increased by an amount equivalent to that of each allowable inertia torque Timax. Thus, variation of the allowable inertia torque Timax according to each driving mode allows the downshift of the continuously variable transmission 12 at the shift speed matching power characteristics in each driving mode while suppressing shift shock.

When the engine torques Te are each increased or reduced by the amount equivalent to that of each allowable inertia torque Timax, while speed shifting operations are each being performed at the shift speed equivalent to each upper-limit shift speed V2, as illustrated in FIGS. 13, 14, 16, and 17, drive wheel torques Tout are changed smoothly so as to allow the shift shock to be avoided. In contrast, as illustrated in FIGS. 12 and 15, in the high-power mode, the allowable inertia torques Timax above the torque increase or decrease amount Tmax are set. That is, because each allowable inertia torque Timax above an allowable range of the engine 11 is set, the engine 11 cannot absorb entire inertia torque, so that some of the inertia torque is generated as a fluctuation in a drive wheel torque Tout (reference character X). Thus, in the high-power mode in which quick speed shifting is preferred, even in the case where a moderate shift shock is intentionally provided to enhance marketability, simplified work of only adjusting the foregoing mode coefficient k allows tuning to be performed.

Figure 18A:
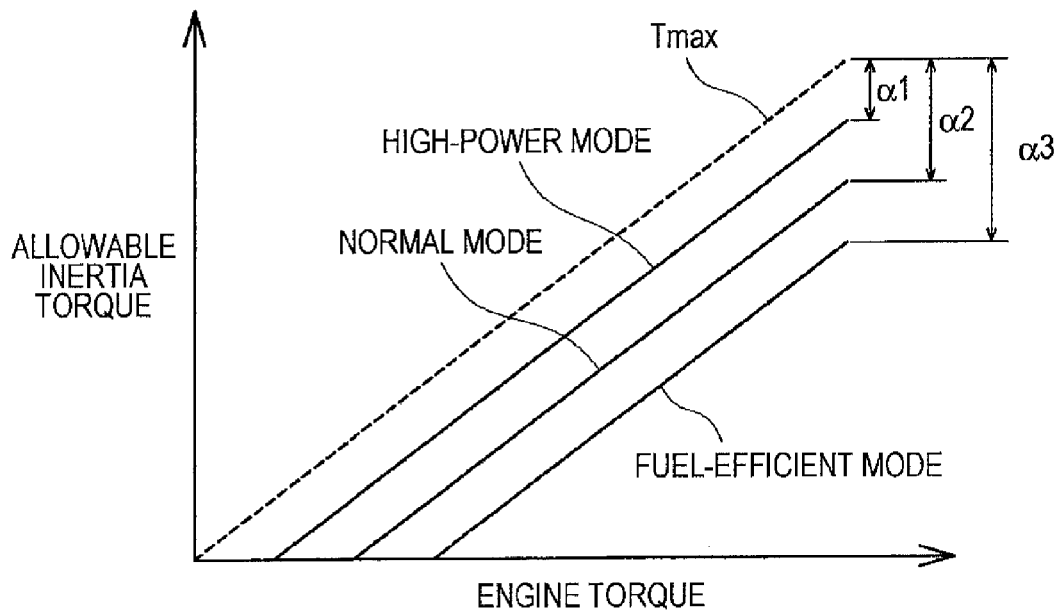
FIGS. 18A and 18B are diagrams illustrating other examples of an allowable inertia torque set in each driving mode.
Figure 18B:
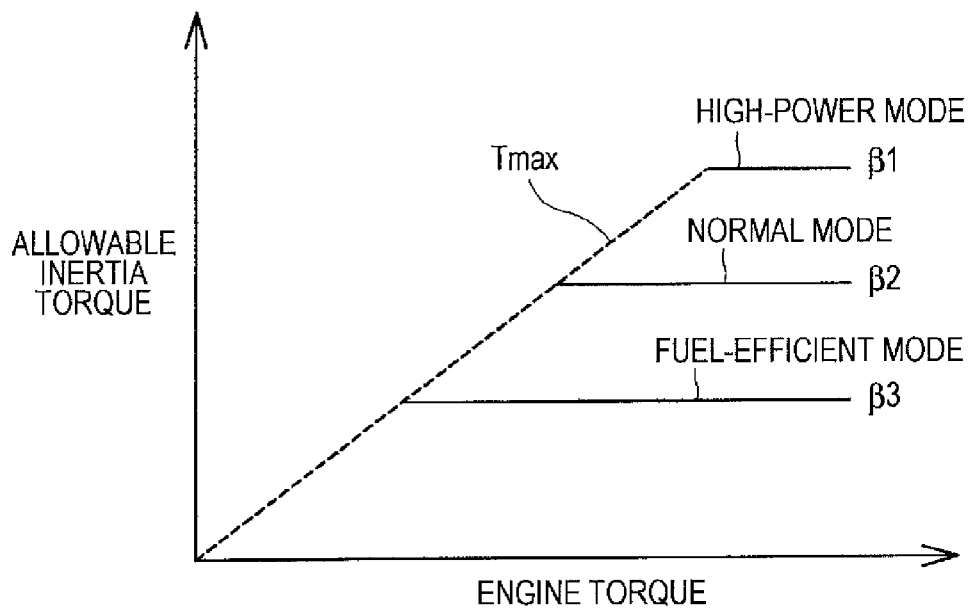

In the foregoing description, in order to vary the allowable inertia torque Timax in accordance with each driving mode, the torque increase or decrease amount Tmax is multiplied by the mode coefficient k that is set corresponding to each driving mode. However, the way to calculate the allowable inertia torque Timax is not limited to this. FIGS. 18A and 18B are diagrams illustrating other examples of an allowable inertia torque to be set in each driving mode. As illustrated in FIG. 18A, constants $\alpha 1$ to $\alpha 3$ are set in the respective driving modes, and the constants $\alpha 1$ to $\alpha 3$ may be each subtracted from the torque increase or decrease amount Tmax to calculate the allowable inertia torque Timax. Also, as illustrated in FIG. 18B, upper limits $\beta 1$ to $\beta 3$ are set in the respective driving modes, and a smaller value between the torque increase or decrease amount Tmax and each of the upper limits $\beta 1$ to $\beta 3$ may be set as the allowable inertia torque Timax.

The present invention is not limited to the above-described embodiment, and various modifications can be made without departing from the gist thereof. For example, the driving mode used to switch power characteristics includes three types of modes: high-power mode, normal mode, and fuel-efficient mode, however, may include two types or four or more types of modes. In the foregoing description, the engine torque is increased or decrease during the speed shifting in the multi-stage transmission mode; however, engine torque may be increased or decrease during speed shifting in a continuously variable transmission mode. Furthermore, as a continuously variable transmission, the chain-drive continuously variable transmission 12 is provided; however, a belt-drive or toroidal continuously variable transmission may be provided. Additionally, the power unit illustrated in the drawings is the power unit 10 equipped with only the engine 11 as a power source, however, the power unit may be a power unit equipped with the engine 11 and an electric motor, as the power source.

What is claimed is:

1. A vehicle control apparatus comprising:
   a power unit having an engine and a continuously variable transmission connected to the engine;
   a power unit controller for switching power characteristics of the power unit in accordance with a driving mode including a fuel-efficient mode and a high-power mode;
   an engine controller for, when the continuously variable transmission is shifted, increasing or decreasing an engine torque in a direction to counteract an inertia torque to be generated on an input side of the continuously variable transmission and allowing the engine to absorb the inertia torque;
   an inertia torque calculator for calculating an upper limit of the inertia torque to be absorbed by the engine on the basis of an operational state of the engine and the driving mode, the upper limit of the inertia torque in the high-power mode being set be a greater value than that in the fuel-efficient mode when the operational states of the engine are the same;
   an upper-limit shift speed setting unit for calculating a shift speed at which the inertia torque of the upper limit is generated and setting an upper-limit shift speed on the basis of the calculated shift speed; and
   a shift controller for shifting the continuously variable transmission at a shift speed not exceeding the upper-limit shift speed.

2. The vehicle control apparatus according to claim 1, wherein the inertia torque calculator calculates, on the basis of the operational state of the engine, an increase or decrease amount of the engine torque which can be increased or decreased by the engine, corrects the increase or decrease amount on the basis of the setting state of the driving mode, and sets the corrected increase or reduction amount as the upper limit.

3. The vehicle control apparatus according to claim 1, wherein the continuously variable transmission includes a multi-stage transmission mode in which a plurality of speed ratios are set in stages and switched to perform speed shifting, and the engine controller increases or reduces the engine torque during the speed shifting in the multi-stage transmission mode.

4. The vehicle control apparatus according to claim 2, wherein the continuously variable transmission includes a multi-stage transmission mode in which a plurality of speed ratios are set in stages and switched to perform speed shifting, and the engine controller increases or reduces the engine torque during the speed shifting in the multi-stage transmission mode.

5. The vehicle control apparatus according to claim 1, wherein the engine controller decreases the engine torque when the continuously variable transmission is shifted to an acceleration side, and increases the engine torque when the continuously variable transmission is shifted to a deceleration side.

6. The vehicle control apparatus according to claim 2, wherein the engine controller decreases the engine torque when the continuously variable transmission is shifted to an acceleration side, and increases the engine torque when the continuously variable transmission is shifted to a deceleration side.

7. The vehicle control apparatus according to claim 3, wherein the engine controller decreases the engine torque when the continuously variable transmission is shifted to an acceleration side, and increases the engine torque when the continuously variable transmission is shifted to a deceleration side.

8. The vehicle control apparatus according to claim 4, wherein the engine controller decreases the engine torque when the continuously variable transmission is shifted to an acceleration side, and increases the engine torque when the continuously variable transmission is shifted to a deceleration side.

9. The vehicle control apparatus according to claim 1, wherein the driving mode further includes a normal mode in which both the fuel-efficient mode and the high-power mode are simultaneously enabled.

10. The vehicle control apparatus according to claim 1, wherein the engine controller, on the basis of the operational state of the engine and the driving mode, performs a temporary reduction in the engine torque by a torque up amount or a torque down amount corresponding to the inertia torque and at a time corresponding thereto allowing the engine to absorb the inertia torque.

11. The vehicle control apparatus according to claim 2, wherein the engine controller, on the basis of the operational state of the engine and the driving mode, performs a temporary reduction in the engine torque by a torque up amount or a torque down amount corresponding to the inertia torque and at a time corresponding thereto allowing the engine to absorb the inertia torque.

12. The vehicle control apparatus according to claim 1, wherein the inertia torque calculator calculates the upper limit of the inertia torque to be absorbed by the engine on the basis of a predetermined mode coefficient corresponding only to the driving mode.

13. The vehicle control apparatus according to claim 2, wherein the driving mode further includes a normal mode in which both the fuel-efficient mode and the high-power mode are simultaneously enabled.

* * * * *